(12) United States Patent
Kise et al.

(10) Patent No.: US 8,396,336 B2
(45) Date of Patent: Mar. 12, 2013

(54) OPTICAL PHASE MODULATOR AND OPTICAL PHASE MODULATING DEVICE

(75) Inventors: Tomofumi Kise, Tokyo (JP); Masaki Funabshi, Tokyo (JP)

(73) Assignee: Furukawa Electric Co., Ltd, Tokyo (JP)

( * ) Notice: Subject to any disclaimer, the term of this patent is extended or adjusted under 35 U.S.C. 154(b) by 309 days.

(21) Appl. No.: 12/836,539

(22) Filed: Jul. 14, 2010

(65) Prior Publication Data

US 2011/0064351 A1    Mar. 17, 2011

(30) Foreign Application Priority Data

Jul. 16, 2009    (JP) .................... 2009-167703

(51) Int. Cl.
*G02F 1/01* (2006.01)
*G02F 1/035* (2006.01)

(52) U.S. Cl. ......... 385/3; 385/1; 385/2; 385/39; 385/40; 385/45

(58) Field of Classification Search .................. 385/3
See application file for complete search history.

(56) References Cited

U.S. PATENT DOCUMENTS

| | | | |
|---|---|---|---|
| 5,995,685 A * | 11/1999 | Seino | 385/3 |
| 6,650,458 B1 * | 11/2003 | Prosyk et al. | 359/276 |
| 6,781,741 B2 * | 8/2004 | Uesaka | 359/279 |
| 7,035,486 B2 * | 4/2006 | Griffin et al. | 385/3 |
| 7,239,763 B2 * | 7/2007 | Kawanishi et al. | 385/1 |
| 7,245,787 B2 * | 7/2007 | Kawanishi et al. | 385/1 |
| 7,245,788 B2 * | 7/2007 | Fujita et al. | 385/3 |
| 7,272,271 B2 * | 9/2007 | Kaplan et al. | 385/3 |
| 7,526,209 B2 * | 4/2009 | Kawanishi et al. | 398/187 |
| 7,711,215 B2 * | 5/2010 | Kawanishi et al. | 385/3 |
| 7,751,724 B2 * | 7/2010 | Hashimoto et al. | 398/183 |
| 7,773,833 B2 * | 8/2010 | Higuma et al. | 385/3 |
| 7,869,668 B2 * | 1/2011 | Hashimoto et al. | 385/1 |
| 7,899,338 B2 * | 3/2011 | Hashimoto et al. | 398/198 |
| 7,936,996 B2 * | 5/2011 | Kawanishi et al. | 398/186 |
| 7,953,303 B2 * | 5/2011 | Gheorma et al. | 385/3 |
| 7,957,653 B2 * | 6/2011 | Kawanishi et al. | 398/188 |
| 8,041,232 B2 * | 10/2011 | Tanaka et al. | 398/185 |
| 2002/0171900 A1 * | 11/2002 | Ono et al. | 359/181 |
| 2003/0095311 A1 * | 5/2003 | Liu et al. | 359/135 |
| 2004/0085620 A1 * | 5/2004 | Kawanishi et al. | 359/326 |
| 2005/0175357 A1 * | 8/2005 | Kawanishi et al. | 398/187 |
| 2007/0133918 A1 * | 6/2007 | Cho et al. | 385/1 |
| 2007/0212075 A1 * | 9/2007 | Yin | 398/183 |
| 2009/0047028 A1 * | 2/2009 | Terahara et al. | 398/188 |
| 2009/0220235 A1 * | 9/2009 | Joyner et al. | 398/79 |
| 2009/0232440 A1 * | 9/2009 | Kawanishi et al. | 385/3 |
| 2010/0316326 A1 * | 12/2010 | Sugiyama | 385/3 |

* cited by examiner

*Primary Examiner* — Ryan Lepisto
(74) *Attorney, Agent, or Firm* — Turocy & Watson, LLP

(57) ABSTRACT

An optical phase modulator includes a main Mach-Zehnder interferometer having first and second main optical waveguide path arms, whose initial phase difference in the used wavelength is π, a first sub Mach-Zehnder interferometer having first and second sub optical waveguide path arms that are formed in the first main optical waveguide path arm, whose initial phase difference in the used wavelength is 0, and a second sub Mach-Zehnder interferometer having third and fourth sub optical waveguide path arms that are formed in the second main optical waveguide path arm, and whose initial phase difference in the used wavelength is 0. Of each of the main optical waveguide path arms and the sub optical waveguide path arms, at least the portions where high-frequency electrodes are formed are constructed using semiconductor waveguide paths, and reduce the effects of frequency chirping caused by an orthogonal component due to light absorption in the semiconductor.

8 Claims, 24 Drawing Sheets

TABLE 1

OPERATION OF THE MAIN MACH-ZEHNDER (MAIN MZ) 11

| OUTPUT LIGHT PHASE | BIPOLAR SIGNAL 43 | INVERTED SIGNAL 44 | VOLTAGE OF THE FIRST HIGH-FREQUENCY ELECTRODE 11a1 | VOLTAGE OF THE SECOND HIGH-FREQUENCY ELECTRODE 11b1 | LIGHT ABSORPTION OF THE FIRST MAIN ARM 11a | LIGHT ABSORPTION OF THE SECOND MAIN ARM 11b |
|---|---|---|---|---|---|---|
| 0 | $-\Delta V$ | $+\Delta V$ | $-Vb1-\Delta V$ | $-Vb1+\Delta V$ | LARGE | SMALL |
| $\pi$ | $+\Delta V$ | $-\Delta V$ | $-Vb1+\Delta V$ | $-Vb1-\Delta V$ | SMALL | LARGE |

SUB MZ21 OF THE FIRST MAIN ARM 11a

| VOLTAGE OF THE THIRD HIGH-FREQUENCY ELECTRODE 21a1 | VOLTAGE OF THE FOURTH HIGH-FREQUENCY ELECTRODE 21b1 | OUTPUT OF MZ21 (SEE FIG. 6) |
|---|---|---|
| $-Vb2-\alpha\Delta V$ | $-Vb3+\beta\Delta V$ | IN-PHASE (BECOMES STRONG) |
| $-Vb2+\alpha\Delta V$ | $-Vb3-\beta\Delta V$ | OUT-OF-PHASE (BECOMES WEAK) |

SUB MZ22 OF THE SECOND MAIN ARM 11b

| VOLTAGE OF THE FIFTH HIGH-FREQUENCY ELECTRODE 22a1 | VOLTAGE OF THE SIXTH HIGH-FREQUENCY ELECTRODE 22b1 | OUTPUT OF MZ22 (SEE FIG. 6) |
|---|---|---|
| $-Vb3-\alpha\Delta V$ | $-Vb2+\beta\Delta V$ | OUT-OF-PHASE (BECOMES WEAK) |
| $-Vb3+\alpha\Delta V$ | $-Vb2-\beta\Delta V$ | IN-PHASE (BECOMES STRONG) |

$\alpha$: VOLTAGE DAMPING RATE OF VOLTAGE REGULATOR 45
$\beta$: VOLTAGE DAMPING RATE OF VOLTAGE REGULATOR 46

$Vb2 < Vb3$
$\Delta V = Vpp/2$
$\Delta V < Vb1, \alpha\Delta V < Vb2, \beta\Delta V < Vb3$

FIG. 8

-- prior art --

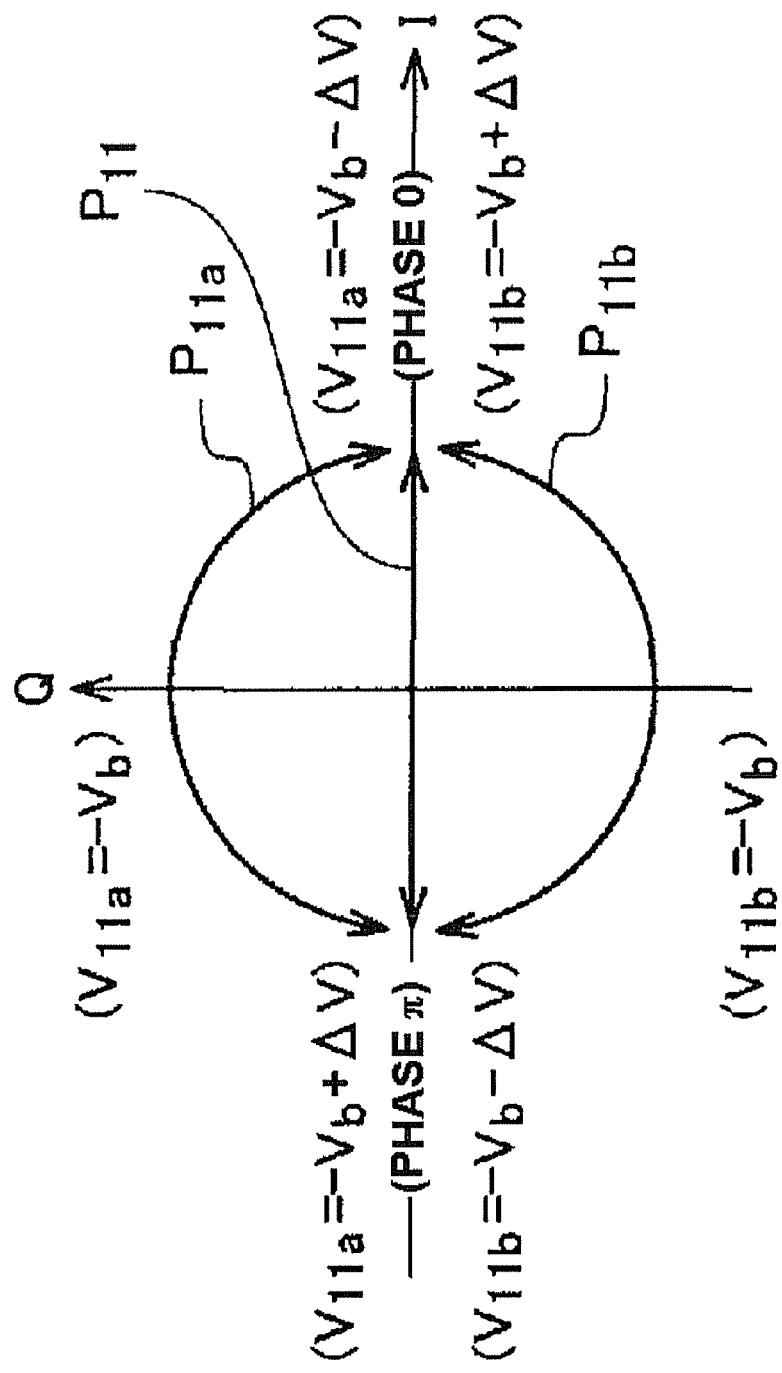
FIG. 17A -- prior art --

-- prior art --

OPTICAL PHASE MODULATOR AND OPTICAL PHASE MODULATING DEVICE

CROSS-REFERENCE TO RELATED APPLICATIONS

This application claims priority from Japanese patent application No. 2009-167703, filed on Jul. 16, 2009, the entire content of which is incorporated herein by reference.

BACKGROUND OF THE INVENTION

1. Field of the Invention

The present invention relates to an optical phase modulator and optical phase modulating device that are used in optical phase modulating using optical phase.

2. Description of the Related Art

In addition to conventional intensity modulation as a method of modulating light in optical communication by an electrical signal, there is also optical phase modulation. Optical phase modulation differs from conventional optical intensity modulation, which performs modulation between ON and OFF of the optical intensity; for example, the followings are known, i.e., there is binary optical phase modulation (for example, DPSK: Differential Phase Shift Keying) that performs modulation using two different optical phases, 4-value optical phase modulation (for example, DQPSK: Differential Quadrature Phase Shift Keying) that performs modulation using four different optical phases, or 16QAM (Quadrature Amplitude Modulation) that uses a combination of sixteen types of different amplitudes and phases). In optical phase modulation, generally it is possible to improve the receiving sensitivity when compared with optical intensity modulation. In addition, in multi-value optical phase modulation such as the DQPSK method and 16QAM method, it is possible to transmit a plurality of bits of information per one phase (symbol), so it is possible to efficiently increase the transmission capacity. In order to generate a phase modulation signal, a binary optical modulator (DPSK optical phase modulator) that uses a Mach-Zehnder modulator (MZ modulator) such as disclosed in patent literature 1 is used.

FIG. 16 is a schematic diagram illustrating the construction of a DPSK optical phase modulator that comprises a MZ modulator as an example of a binary optical phase modulator. The MZ modulator 11 comprises two optical waveguide path arms 11a, 11b. The light that enters into the MZ modulator is divided and guided into each of the optical waveguide path arms 11a, 11b. Electrodes 11a1, 11b1 are provided in the optical waveguide path arms 11a, 11b, respectively, and the phase of the light passing through each optical waveguide path arm 11a, 11b is changed by using the change in the index of refraction due to the electro-optical effect when voltage is applied to the electrodes. After that, these two lights are combined. Here, in the optical waveguide path arms 11a, 11b, the difference in the optical path lengths is adjusted so that the initial phase difference in the used wavelength when there is no modulation is $\pi$, or in other words, so that the output light is in a extinction state.

FIG. 17A is a diagram in which the phase of the optical field of the light that passes through the optical waveguide path arms 11a, 11b is expressed in polar coordinates using the in-phase component I and the quadrature component Q. In FIG. 17A, the distance from the origin expresses the amplitude of the electric field, and the angle from the I axis expresses the phase angle. The voltage V11a that is applied to the upper optical waveguide path arm 11a via the electrode 11a1 changes around the reverse bias voltage (V11a=−Vb) between −Vb+ΔV to −Vb−ΔV (where Vb>ΔV), and the phase of the output optical field P11a of the upper optical waveguide path arm 11a changes between $\pi$ and 0 according to this change. Moreover, the voltage V11b that is applied to the lower optical waveguide path arm 11b via the electrode 11b1 changes around the reverse bias voltage (V11b=−Vb) between −Vb−ΔV to −Vb+ΔV, and the phase of the output optical field P11b of the lower optical waveguide path arm 11b changes between −$\pi$ and 0 according to this change. Therefore, when a signal ΔV and an inverted signal of this signal are applied to the optical waveguide path arms 11a, 11b and the reverse bias voltage (−Vb) is superimposed on this, the phase of the output optical field P11 from the MZ modulator, in which light from each optical waveguide path arm 11a, 11b is combined, becomes 0 (V11a=−Vb−ΔV, V11b=−Vb+ΔV) or $\pi$(V11a=−Vb+ΔV, V11b=−Vb−ΔV). In other words, in the MZ modulator 11, phase modulation of the output optical field P11 is performed on the I axis between the two values 0 and $\pi$. FIG. 17B is a diagram illustrating the relationship between the voltage (−V11a, −V11b) that is applied to the optical waveguide path arms 11a, 11b and the phase of the output light.

FIG. 18 is a schematic diagram illustrating the construction of a DQPSK optical phase modulator as one example of a 4-value optical phase modulator. As illustrated in FIG. 18, in the DQPSK optical phase modulator 13 two of the MZ modulators (DPSK optical phase modulators) illustrated in FIG. 16 (11-1, 11-2) are connected in parallel using a branching optical waveguide path 31 and combining optical waveguide path 32, where a phase shifter 30 that shifts the phase of the passing light by just $\pi/2$ is located on one of the branches of the branching optical waveguide path 31. FIG. 19A and FIG. 19B express the phase of the output light from the DPSK optical phase modulators 11-1, 11-2 in polar coordinates using the I component and Q component, where in DPSK optical phase modulator 11-1 phase modulation is performed on the I axis between the two phase values 0 and $\pi$ as described above, and in the DPSK optical phase modulator 11-2, the $\pi/2$ phase shifter 30 shifts the phase by just $\pi/2$, so phase modulation is performed on the Q axis between the two values $\pi/2$ and $3\pi/2$. As a result, the phase of the output light from the DQPSK optical phase modulator 13 becomes the phase of the sum of the vectors of the output electric fields P11-1, P11-2 that are output from the two DPSK optical phase modulators 11-1, 11-2, and as illustrated in FIG. 18C becomes $\pi/4$, $3\pi/4$, $5\pi/4$ and $7\pi/4$ according to the signal voltage that is applied to the DPSK optical phase modulators 11-1, 11-2.

As the number of binary optical phase modulator arranged in parallel further increases, it is possible to achieve even higher multi-value phase modulation (quadrature amplitude modulation) such as 16QAM or 256QAM. A binary optical phase modulator outputs light having the two phases 0 or $\pi$ according to the input signals in this way, and multi-value optical phase modulators such as a 4-value optical phase modulator or 16QAM can be constructed by combining a plurality of binary optical phase modulators.

MZ modulators that use LiNbO3 as the material have already been put into practical use. A MZ modulator that uses LiNbO3 takes advantage of the Pockets Effect as an electro-optical effect. A MZ modulator that uses LiNbO3 is characterized by having small light loss, however, the size is several inches, which is large, and the driving voltage is also high. On the other hand, a MZ modulator that uses a semiconductor such as InP uses the Franz-Keldysh Effect or Quantum Confined Stark Effect (QCSE) as an electro-optical effect, so the modulator can be made more compact than a modulator that uses LiNbO3, and has a lower driving voltage. In addition, this MZ modulator has the advantage in that integration with devices such as a light source is easy. Therefore, in the future, in the case where construction of a modulator is complicated such as a multi-value optical phase modulator, a semiconductor MZ modulator, which is capable of miniaturization and integration, is promising.

Patent Literature 1: Japanese Patent Application No. H9-061766

However, a conventional semiconductor MZ modulator has the following problems. That is, in a semiconductor MZ modulator, as was described above, the Franz-Keldysh Effect or Quantum Confined Stark Effect is used, so as voltage is applied, not only does the optical phase change, but the absorption coefficient changes as well. Therefore, as illustrated in FIG. 20, when a voltage in the reverse direction is applied, damping of the optical field becomes large, so the amplitude of that optical field becomes small. As a result, an orthogonal component occurs in the optical field P11 of the output light that is output as a sum of vectors of the optical fields P11a, P11b of the optical waveguide path arms 11a, 11b. For example, when expressing phase 0, the voltage applied in the reverse direction to the optical waveguide path arm 11a is large (V11a=-Vb-ΔV), and the voltage applied in the reverse direction to the optical waveguide path arm 11b is small (V11b=-Vb+ΔV). Therefore, absorption of light by the optical waveguide path arm 11a is greater than the absorption of light by the optical waveguide path arm 11b, and vertical asymmetry occurs in the amplitude of the optical field as illustrated in FIG. 20. Consequently, when the voltage that is applied to the optical waveguide path arms 11a, 11b is changed between -Vb-ΔV and -Vb+ΔV, an orthogonal component (Q component) occurs in the trajectory of the vector sum of the optical fields as illustrated in FIG. 20. The phase difference that is due to this orthogonal electric field becomes the cause of frequency chirping, and when transmitting an optical signal, the transmitted signal degrades due to fiber dispersion.

Taking into consideration the problems described above, the object of the present invention is to provide an optical phase modulator and optical phase modulating device that are capable of reducing the effect of frequency chirping due to an orthogonal component that is caused by absorption of light by a semiconductor.

SUMMARY OF THE INVENTION

In order to solve the problems described above, the present invention provides an optical phase modulator as described below.

(1) A binary optical phase modulator that comprises: a main Mach-Zehnder interferometer having a first main optical waveguide path arm and a second main optical waveguide path arm, which have a first high-frequency electrode and a second high-frequency electrode, respectively, and whose initial phase difference in the used wavelength is π; a first sub Mach-Zehnder interferometer having a first sub optical waveguide path arm and a second sub optical waveguide path arm that are formed in the first main optical waveguide path arm, which have a third high-frequency electrode and a fourth high-frequency electrode, respectively, and whose initial phase difference in the used wavelength is 0; and a second sub Mach-Zehnder interferometer having a third sub optical waveguide path arm and a fourth sub optical waveguide path arm that are formed in the second main optical waveguide path arm, which have a fifth high-frequency electrode and a sixth high-frequency electrode, respectively, and whose initial phase difference in the used wavelength is 0; wherein of the first and second main optical waveguide path arms and the first through fourth sub optical waveguide path arms, at least the portion where the first through sixth high-frequency electrodes are formed are semiconductor waveguide paths that are formed on a semiconductor substrate.

(2) A binary optical phase modulator wherein the portion other than the portion where the first through sixth high-frequency electrodes are formed include silica optical waveguide paths that are formed on a substrate; and the semiconductor optical waveguide paths and the silica optical waveguide paths are put together at the end surfaces thereof and optically coupled.

(3) A 4-value optical phase modulator that comprises: one of the binary optical phase modulators according to (1) or (2); another one of the binary phase modulators according to (1) or (2); an input optical waveguide path that divides the input light at the input ends of the one binary optical phase modulator and the other binary optical phase modulator; an output optical waveguide path that combines the light from the output ends of the one binary optical phase modulator and the other binary optical phase modulator; and a phase shifter that cause the phase of the output light from the one binary optical phase modulator and the other binary optical phase modulator to differ by π/2.

(4) A multi-value optical phase modulator that comprises: a branching optical waveguide path in which two-branch dividing units are connected in an n-level cascade connection (n is a natural number); $2^n$ number of binary optical phase modulators that are connected in parallel to the branch ends of the branching optical waveguide path; and a combining optical waveguide path in which two-branch combining units are connected in an n-level cascade connection to the output ends of the $2^n$ number of binary optical phase modulators; wherein of the $2^n$ number of binary optical phase modulators, at least one is a binary optical phase modulator according to (1) or (2).

Also, in order to solve the aforementioned problems, the present invention provides the following kind of optical phase modulating devices.

(5) A binary optical phase modulating device, that comprises: a binary optical phase modulator according to (1) or (2); a signal generation means that includes a signal generator that generates a bipolar signal, and an inverted signal generator that generates an inverted signal of the bipolar signal; a voltage regulation means that includes a first voltage regulator to which the bipolar signal is input from the signal generator and that outputs a signal having reduced voltage amplitude, and a second voltage regulator to which the inverted signal is input from the inverted signal generator and that outputs a signal having reduced voltage amplitude; and a bias voltage supply means having a first bias voltage supply unit that supplies a reverse bias voltage (-Vb1) having an absolute value that is greater than the value of the voltage amplitude (ΔV) of the bipolar signal, a second bias voltage supply unit that supplies a second reverse bias voltage (-Vb2) having an absolute value that is greater than the output voltage amplitude from the first voltage regulator and greater than the output voltage amplitude from the second voltage regulator, and a third bias voltage supply unit that supplies a third reverse bias voltage (-Vb3) having an absolute value that is greater than the output voltage amplitude from the first voltage regulator and greater than the output voltage amplitude from the second voltage regulator; wherein the bipolar signal and the inverted signal are respectively superimposed with the first reverse bias voltage (-Vb1) from the first bias voltage supply unit and applied to the first high-frequency electrode and the second high-frequency electrode; and the output from the first and second voltage regulators and the second and third reverse bias voltages (−Vb2, −Vb3) are set and connected to the third through sixth high-frequency electrodes so that the large difference in light absorption caused by applying voltage to the first and second high-frequency electrodes is compensated by the difference in output light intensity of the first and second sub Mach-Zehnder interferometers.

(6) A binary optical phase modulating device that comprises: a binary optical phase modulator according to (1) or (2); a signal generation means that includes a signal generator that generates a bipolar signal, and an inverted signal generator that generates an inverted signal of the bipolar signal; a voltage regulation means that includes a first voltage regulator to which the bipolar signal is input from the signal generator and that outputs a signal having reduced voltage amplitude, and a second voltage regulator to which the inverted signal is input from the inverted signal generator and that outputs a signal having reduced voltage amplitude; and a bias voltage supply means having a first bias voltage supply unit that supplies a first reverse bias voltage (−Vb1) having an absolute value that is greater than the value of the voltage amplitude (ΔV) of the bipolar signal, a second bias voltage supply unit that supplies a second reverse bias voltage (−Vb2) having an absolute value that is greater than the output voltage amplitude from the first voltage regulator and greater than the output voltage amplitude from the second voltage regulator, and a third bias voltage supply unit that supplies a third reverse bias voltage (−Vb3) having an absolute value that is greater than the output voltage amplitude from the first voltage regulator and greater than the output voltage amplitude from the second voltage regulator; wherein the bipolar signal and the inverted signal are superimposed with the first reverse bias voltage (−Vb1) from the first bias voltage supply unit, respectively, and applied to the first high-frequency electrode and the second high-frequency electrode; the output voltage from the first voltage regulator is superimposed with the second reverse bias voltage (−Vb2) from the second bias voltage supply unit, and the third reverse bias voltage (−Vb3) from the third bias voltage supply unit, respectively, and applied to the third high-frequency electrode and the fifth high-frequency electrode; the output voltage from the second voltage regulator is superimposed with the third reverse bias voltage (−Vb3) from the third bias voltage supply unit, and second reverse bias voltage (−Vb2) from the second bias voltage supply unit, respectively, and applied to the fourth high-frequency electrode and the sixth high-frequency electrode; and the second reverse bias voltage (−Vb2) and the third reverse bias voltage (−Vb3) are set near the straight line of relational expression (Vu=V1) that indicates the in-phase condition between the voltage (−Vu) that is applied to the third high-frequency electrode or the fifth high-frequency electrode and the voltage (−V1) that is applied to the fourth high-frequency electrode or sixth high-frequency electrode, where the absolute value of the second reverse bias voltage (−Vb2) is less than the absolute value of the third reverse bias voltage (−Vb3) (Vb2<Vb3).

(7) A binary optical phase modulating device that comprises: a binary optic phase modulator according to (1) or (2); a signal generation means that includes a signal generator that generates a bipolar signal, and an inverted signal generator that generates an inverted signal of the bipolar signal; a voltage regulation means that includes a first voltage regulator to which the bipolar signal is input from the signal generator and that outputs a signal having reduced voltage amplitude, and a second voltage regulator to which the inverted signal is input from the inverted signal generator and that outputs a signal having reduced voltage amplitude; and a bias voltage supply means having a first bias voltage supply unit that supplies a first reverse bias voltage (−Vb1) having an absolute value that is greater than the value of the voltage amplitude (ΔV) of the bipolar signal, a second bias voltage supply unit that supplies a second reverse bias voltage (−Vb2) having an absolute value that is greater than the output voltage amplitude from the first voltage regulator and greater than the output voltage amplitude from the second voltage regulator, and a third bias voltage supply unit that supplies a third reverse bias voltage (−Vb3) having an absolute value that is greater than the output voltage amplitude from the first voltage regulator and greater than the output voltage amplitude from the second voltage regulator; wherein the bipolar signal and the inverted signal are superimposed with the first reverse bias voltage (−Vb1) from the first bias voltage supply unit, respectively, and applied to the first high-frequency electrode and the second high-frequency electrode; the output voltage from the second voltage regulator is superimposed with the second reverse bias voltage (−Vb2) from the second bias voltage supply unit, and the third reverse bias voltage (−Vb3) from the third bias voltage supply unit, respectively, and applied to the third high-frequency electrode and the fifth high-frequency electrode; the output voltage from the first voltage regulator is superimposed with the third reverse bias voltage (−Vb3) from the third bias voltage supply unit, and second reverse bias voltage (−Vb2) from the second bias voltage supply unit, respectively, and applied to the fourth high-frequency electrode and the sixth high-frequency electrode; and the second reverse bias voltage (−Vb2) and the third reverse bias voltage (−Vb3) are set near the straight line of relational expression (Vu=V1) that indicates the in-phase condition between the voltage (−Vu) that is applied to the third high-frequency electrode or the fifth high-frequency electrode and the voltage (−V1) that is applied to the fourth high-frequency electrode or sixth high-frequency electrode, where the absolute value of the second reverse bias voltage (−Vb2) is greater than the absolute value of the third reverse bias voltage (−Vb3) (Vb2>Vb3).

(8) A 4-value optical phase modulating device that comprises: one binary optical phase modulating device according to any one of (5) to (7); another one binary optical phase modulating devices according to any one of (5) to (7); an input optical waveguide path that divides input light at the input ends of the binary optical phase modulators of the one binary optical phase modulating device and the binary optical phase modulators of the other one binary optical phase modulating device; an output optical waveguide path that combines the light from the output ends of binary optical phase modulators of the one binary optical phase modulating device and the binary optical phase modulators of the other one binary optical phase modulating device; and phase shifters that cause the phase of the output light from one binary optical phase modulator of the one binary optical phase modulating device and one binary optical phase modulator of the other binary optical phase modulating device to differ by π/2.

(9) A 16-value or greater multi-value optical phase modulating device comprising in part at least one binary optical phase modulating device according to any one of (5) to (7).

With the present invention it is possible to provide an optical phase modulator and optical phase modulating device that are capable of reducing the effects of frequency chirping caused by an orthogonal component that occurs due to light absorption by a semiconductor.

The above and other object, features, advantages and technical and industrial significance of this invention will be better understood by reading the following detailed description of presently preferred embodiments of the inventions, when considered in connection with the accompanying drawings.

BRIEF DESCRIPTION OF THE DRAWINGS

FIG. 8 is a diagram (Table 1) that explains the operation of a DPSK optical phase modulating device the uses the DPSK optical phase modulator of a first embodiment of the present invention.

FIGS. 17A and 17B are diagrams for explaining the operation of phase modulation in a DPSK optical phase modulator.

DETAILED DESCRIPTION OF THE PREFERRED EMBODIMENTS

The optical phase modulators and optical phase modulating devices of the preferred embodiments of the present invention are explained in detail with reference to the accompanying drawings. In order for simplification of the explanation, the same reference numbers will be used for parts having the same function.

Embodiment 1

Figure 1:
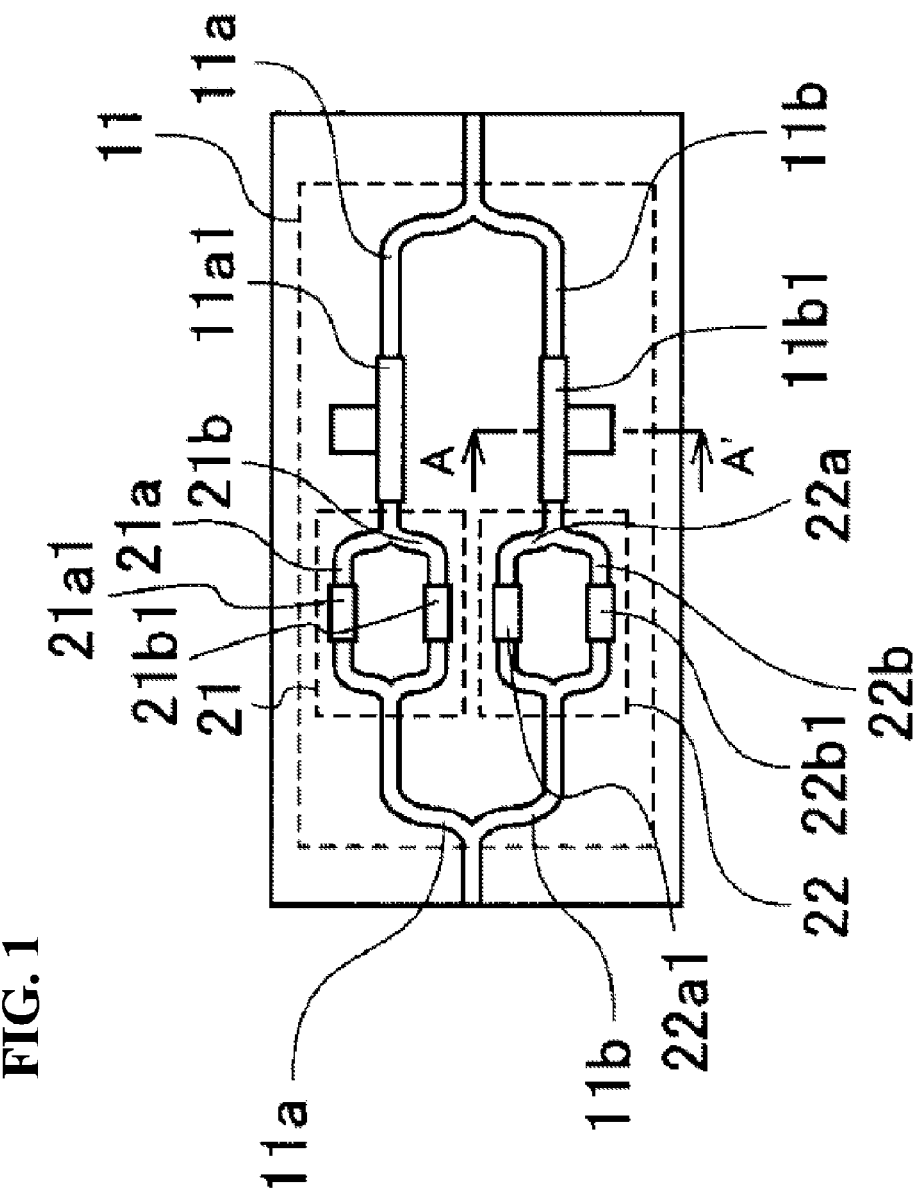
FIG. 1 is a top view that schematically illustrates the construction of a DPSK optical phase modulator, which is the optical phase modulator of a first embodiment of the present invention.

The construction of an optical phase modulation of a first embodiment of the present invention will be explained using FIG. 1. FIG. 1 is a top view that schematically illustrates the construction of a DPSK optical phase modulator as one example of binary optical phase modulators, which is the optical phase modulator of a first embodiment of the present invention. The DPSK optical phase modulator 100 is formed on a semiconductor substrate and the optical waveguide paths are formed using semiconductor layers. The DPSK optical phase modulator 100 comprises a Mach-Zehnder interferometer 11 having two main optical waveguide path arms 11a, 11b, with a first high-frequency electrode 11a1 and second high-frequency electrode 11b1 being provided in the main optical waveguide path arms 11a, 11b, respectively. In addition, a sub Mach-Zehnder interferometer 21 comprising a first sub optical waveguide path arm 21a and a second sub optical waveguide path arm 21b is provided in the main optical waveguide path arm 11a, and a sub Mach-Zehnder interferometer 22 comprising a third sub optical waveguide path arm 22a and a fourth sub optical waveguide path arm 22b is provided in the main optical waveguide path arm 11b. A third high-frequency electrode 21a1 is formed in the first sub optical waveguide path arm 21a, a fourth high-frequency electrode 21b1 is formed in the second sub optical waveguide path arm 21b, a fifth high-frequency electrode 22a1 is formed in the third sub optical waveguide path arm 22a, and a sixth high-frequency electrode 22b1 is formed in the fourth sub optical waveguide path sub arm.

The two sub optical waveguide path arms 21a, 21b of the first sub Mach-Zehnder interferometer 21 are manufactured having an optical waveguide path shape such that the phase difference (initial phase difference) between the propagated light in the used wavelength (for example, 1550 nm) in a state in which no voltage is applied to the third high-frequency electrode 21a1 and fourth high-frequency electrode 21b1 is '0', and the sub optical waveguide path arms 22a, 22b of the second sub Mach-Zehnder interferometer 22 are similarly manufactured having an optical waveguide path shape such that the initial phase difference in the used wavelength is '0'.

On the other hand, the first main optical waveguide path arm 11a that is formed using the first sub Mach-Zehnder interferometer 21, and the second main optical waveguide path arm 11b that is formed using the second sub Mach-Zehnder interferometer 22 are manufactured having an optical waveguide path shape such that overall the initial phase difference in the used wavelength is 'π'.

Figure 2:
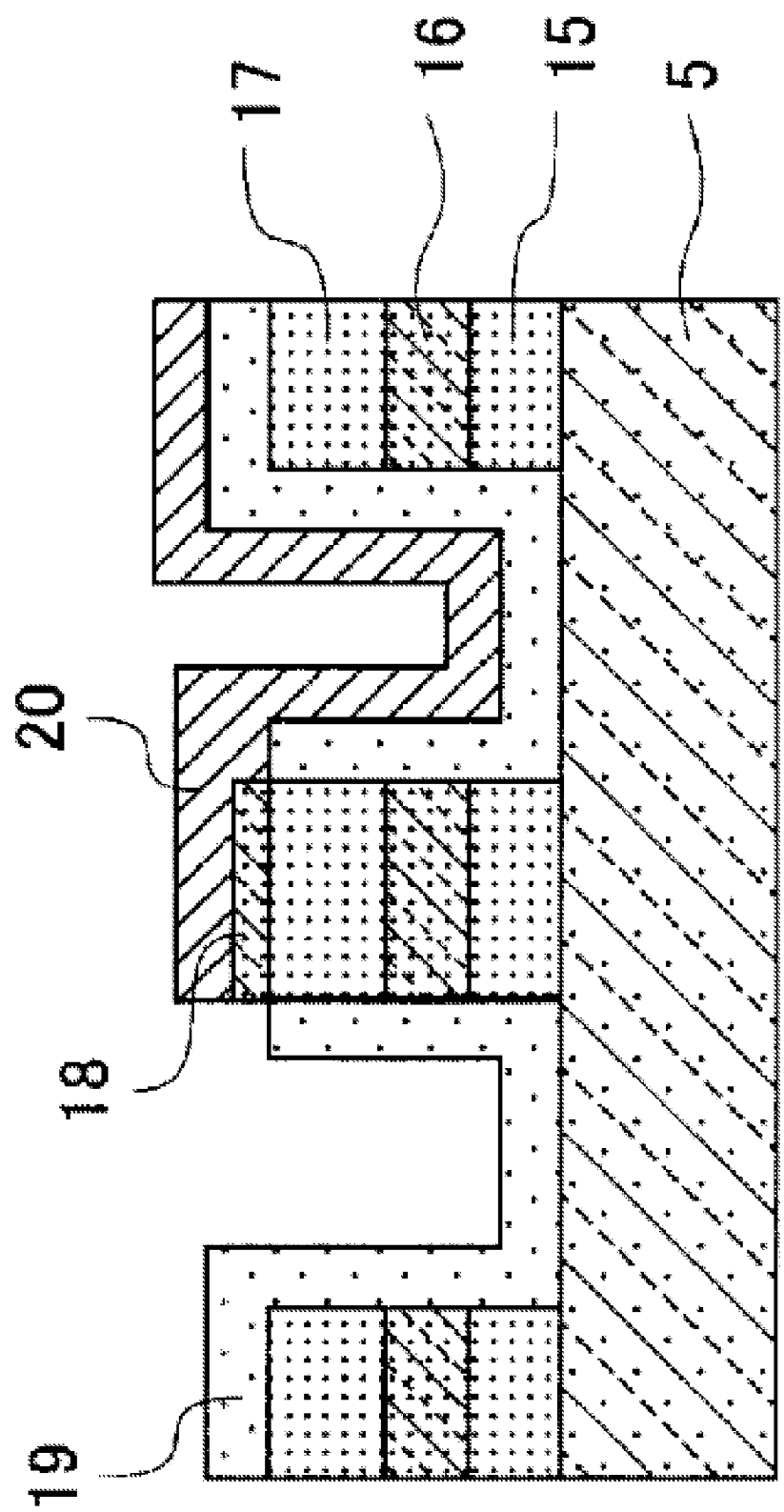
FIG. 2 is a cross-sectional view of the section A-A' in FIG. 1.

Next, the method of manufacturing this DPSK optical phase modulator 100 will be explained while referencing FIG. 2, which is a cross-sectional view of the section A-A' in FIG. 1. The DPSK optical phase modulator 11 is manufactured by the following method. First, using the Metal Organic Chemical Vapor Deposition (MOCVD) method, an n-InP clad layer 15, an active layer 16 comprising quantum well structure (InGaAsP/InGaAsP), a p-InP clad layer 17 and p-InGaAsP contact layer 18 are layered onto an n-InP substrate 5. A SiNx film is then formed over the entire surface, after which a SiNx Mach-Zehnder interferometer waveguide path pattern is formed using photolithography and Reactive Ion Etching (RIE).

Next, using this SiNx Mach-Zehnder interferometer waveguide path pattern as a mask, etching is performed using chlorine dry etching through the active layer until the n-InP clad layer 15 is reached in order to form a deep ridge semiconductor optical waveguide. Furthermore, an insulating layer 19 is formed except in the portions corresponding to the arms for which electrical contact is necessary, and a p electrode 20 is formed on the upper surface of the arms and bonding pad portions. The semiconductor waveguide path described above has deep ridge construction, however shallow ridge construction or embedded construction is also possible. Shallow ridge construction is formed by performing etching up to directly above the active layer. Finally, after polishing the substrate to a thickness of about 120 μm, an n electrode is formed on the rear surface (not illustrated in the figure). Next, this substrate is divided into elements to become an optical phase modulator 100.

(Variation of an Optical Phase Modulator)

Figure 3A:
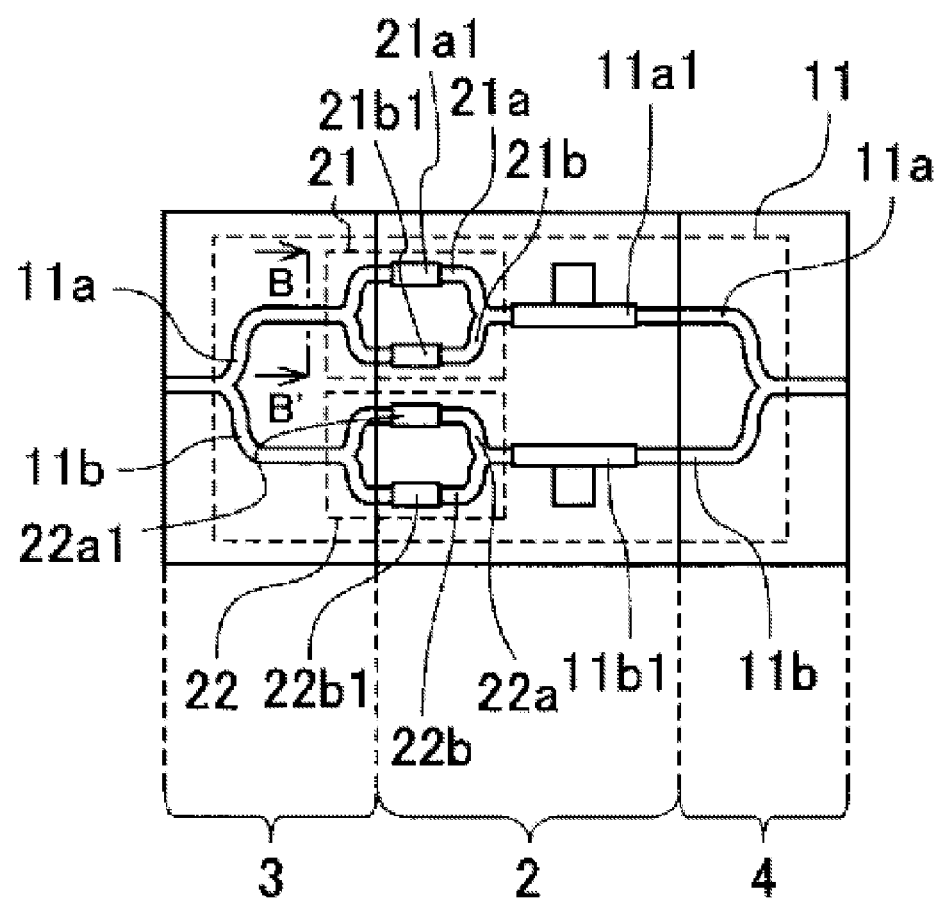
FIG. 3A is a top view that schematically illustrates the construction of a variation of the DPSK optical phase modulator of a first embodiment of the present invention.
Figure 3B:
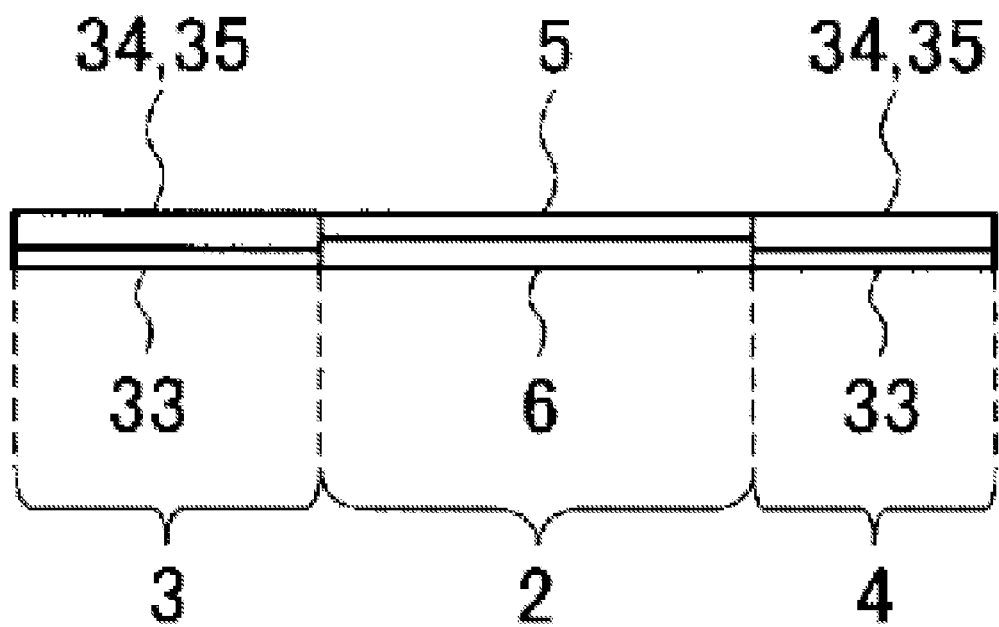
FIG. 3B is a front view of the same.

FIG. 3A is a top view that schematically illustrates the construction of a variation of the DPSK optical phase modulator of this first embodiment of the present invention, and FIG. 3B is a front view of the same.

In the DPSK optical phase modulator 200 of the variation illustrated in FIGS. 3A and 3B, the shape of the optical waveguide paths is the same as illustrated in FIG. 1, however, the construction differs in that of the optical waveguide paths, area 2 where the first through sixth high-frequency electrodes (11a1, 11b1, 21a1, 21b1, 22a1, 22b1) are formed is constructed using semiconductor optical waveguide paths, and the other areas 3, 4 are constructed using silica optical waveguide paths. In this variation, in FIG. 3A, area 2 between the position where the first main optical waveguide path arm 11a and second main optical waveguide path arm 11b branch into the first sub optical waveguide path arm 21a, second sub optical waveguide path arm 21b, third sub optical waveguide path arm 22a and fourth sub optical waveguide path arm 22b (position before the third through sixth high-frequency electrodes 21a1, 21b1, 22a1, 22b1), and the position before where the first main optical waveguide path arm 11a and second main optical waveguide path arm 11b join (position after the first and second high-frequency electrodes 11a1, 11b1) is constructed using semiconductor optical waveguide paths, and the other areas 3, 4 are constructed using silica optical waveguide paths.

Figure 4:
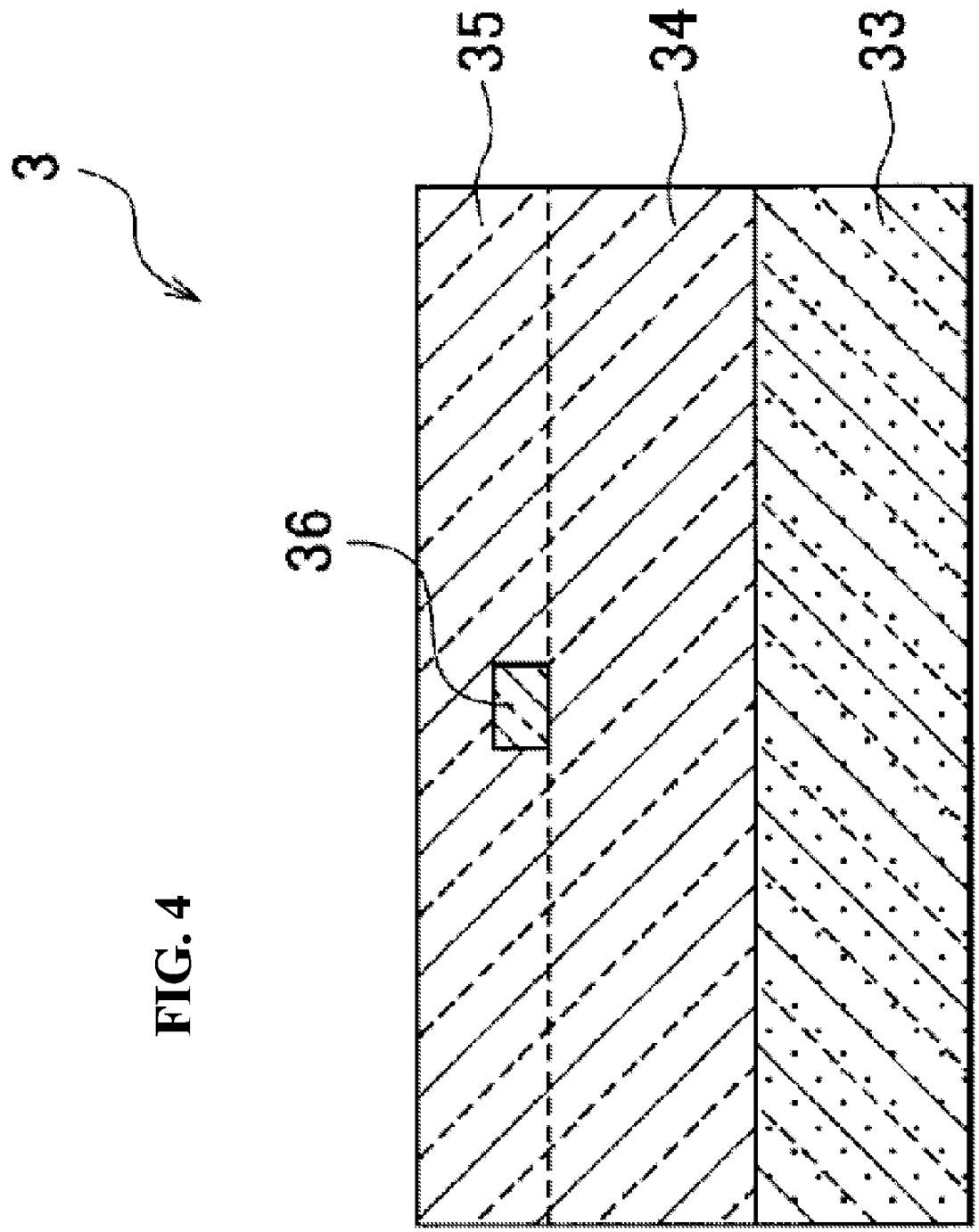
FIG. 4 is a cross-sectional view of section B-B' in FIG. 3A.

FIG. 4 is a cross-sectional view of the section B-B' in the area 3 of FIG. 3. As illustrated in FIG. 4, a silica optical waveguide path comprises; a PLC substrate (for example a silicon substrate) 33, a lower silica clad layer 34 that is formed on the PLC substrate 33, a silica core layer 36 that is formed on this lower clad layer 34, and an upper silica clad layer 35 that is formed on the lower clad layer 34 and core layer 36. By doping the core layer 36 with Germanium, the index of refraction of the core layer 36 becomes greater than the index of refraction of the clad layers 34, 35.

Next, the method of manufacturing the DPSK optical phase modulator of this variation will be explained. Of the DPSK optical phase modulator 200, the area 2 comprising semiconductor optical waveguide paths is manufactured by the method already described above, and is bonded to a silicon submount 6.

On the other hand, of the DPSK optical phase modulator 200, the areas 3, 4 comprising silica optical waveguide paths are manufactured as described below. First, glass particles that will become the lower clad layer 34 and core layer 36 are deposited on the PLC substrate (silicon substrate) using the Flame Hydrolysis Deposition (FHD) method, and then heated to melt the glass film and make the film transparent. After that, the desired optical waveguide path pattern is formed using photolithography and RIE, which are semiconductor integrated circuit path manufacturing techniques, then the upper clad 35 is formed using the FHD method again, and heated to melt the film and make the film transparent.

The silica optical waveguide path on the PLC substrate 33 and the semiconductor optical waveguide path on the silicon submount 6 are joined by a butt joint, and the silica optical waveguide path and semiconductor optical waveguide path are integrated by hybrid integration. Positioning is performed, for example by using positioning markers that are formed beforehand on the PLC substrate 33 and silicon submount 6, or an uneven shape for positioning to position the silica optical waveguide paths with the semiconductor optical waveguide paths by performing passive alignment.

The thickness of the semiconductor substrate 5 is thinner than the thickness of the PLC substrate 33, so in this variation, the semiconductor optical waveguide paths on the semiconductor substrate 5 are fixed on the silicon submount 6, and by adhering the PLC substrate 33 and silicon submount 6 together, sufficient bonding strength is obtained.

In the silica optical waveguide paths and semiconductor optical waveguide paths, the spot sizes of the waveguide modes are typically different, so by providing construction for spot-size conversion in the portion where both of the optical waveguide paths are joined together, and matching the spot sizes of the silica optical waveguide paths and semiconductor optical waveguide paths, it is possible to obtain higher coupling efficiency.

In the optical phase modulator 200 of this variation, it is possible to shorten the length of the semiconductor optical waveguide path area 2, so the loss in the semiconductor can be kept low. In addition, a wave combining/dividing unit or optical waveguide path can be manufactured more accurately using silica optical waveguide paths, and by keeping the number of wave combining/dividing units that are manufactured using semiconductor optical waveguide paths to a minimum, it is possible to reduce the increase of extinction degradation due to stray light and insertion loss.

Taking into consideration the ease of manufacturing and positioning, the area 2 that is constructed using semiconductor optical waveguide paths could also be the area between the position after the optical waveguide path is divided into first and second main optical waveguide path arms 11a, 11b, and before being divided into the first sub optical waveguide path arm 21a and second sub optical waveguide path arm 21b, and third sub optical waveguide path arm 22a and fourth sub optical waveguide path arm 22b, and the position before combining the first main optical waveguide path arm 11a and second main optical waveguide path arm 11b (position after the first and second high-frequency electrodes 11a1, 11b1).

(Optical Phase Modulating Device)

Next, a DPSK optical phase modulating device as one example of binary optical phase modulating devices that uses the binary optical phase modulator of the first embodiment of the invention will be explained. In the following, a DPSK optical phase modulating device that uses the DPSK optical phase modulator illustrated in FIG. 1 will be explained, it is also possible to exchange the DPSK optical phase modulator 100 for the DPSK optical phase modulator 200 illustrated in FIG. 3.

Figure 5:
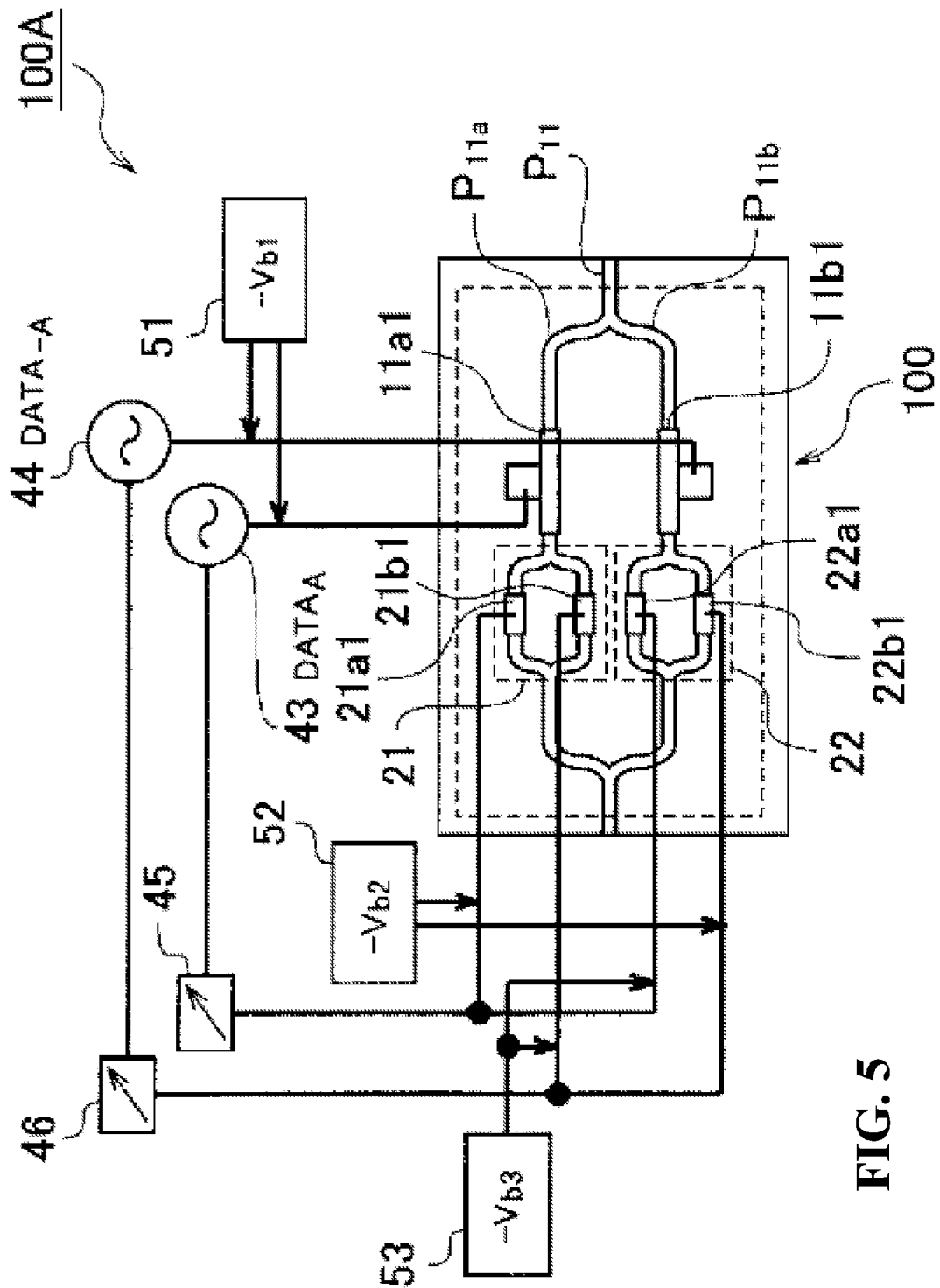
FIG. 5 is a block diagram that schematically illustrates a DPSK optical phase modulating device that uses the DPSK optical phase modulator of a first embodiment of the present invention.

FIG. 5 is a block diagram that schematically illustrates a DPSK optical phase modulating device that uses the DPSK optical phase modulator of the first embodiment of the present invention. As illustrated in FIG. 5, a DPSK optical phase modulating device 100A comprises: the DPSK optical phase modulator 100 illustrated in FIG. 1, a signal generator 43 that generates a bipolar signal; a inverted signal generator 44 that generates an inverted signal that has inverted polarity of that of the signal from the signal generator 43; first and second voltage regulators 45, 46 that damp the amplitude of the voltage signal from the signal generator 43 and inverted signal generator 44; and first through third bias voltage supply units 51, 52, 53.

In FIG. 5, the signal generator 43 generates a voltage signal having a voltage value $+\Delta V/-\Delta V$ ($\Delta V>0$) according to 1/0 of the transmitted signal, and the inverted signal generator 44 generates a signal having polarity that is inverted from that of the signal from the signal generator 43. The voltage output from the signal generator 43 and inverted signal generator 44 is superimposed onto the reverse bias voltage ($-Vb1$) from the first bias voltage supply unit 51, and supplied to the first high-frequency electrode 11a1 and second high-frequency electrode 11b1 of the DPSK optical modulator. Here, $Vb1>\Delta V$ so that the voltage that is applied to the first high-frequency electrode 11a1 and second high-frequency electrode 11b1 is always negative even though the signal may change.

The bipolar signal from the signal generator 43 is input to the first voltage regulator 45, which then dampens the amplitude ($\Delta V$) by the voltage damping rate $\alpha$, and outputs the result. The inverted signal from the inverted signal generator 44 is input to the second voltage regulator 46, which then dampens the amplitude ($\Delta V$) by the voltage damping rate $\beta$, and outputs the result. The output voltage from the first voltage regulator 45 ($\pm\alpha\Delta V$) is superimposed onto the second reverse bias voltage ($-Vb2$) that is supplied from the second bias voltage supply unit 52 and is applied to the third high-frequency electrode 21a1, and is also superimposed onto the third reverse bias voltage ($-Vb3$) that is supplied from the third bias voltage supply unit 53 and is applied to the fifth high-frequency electrode 22a1. In addition, the output voltage ($\pm\beta\Delta V$) from the second voltage regulator 46 is superimposed onto the third reverse bias voltage ($-Vb3$) that is supplied from the third bias voltage supply unit 53 and is applied to the fourth high-frequency electrode 21b1, and is also superimposed onto the second reverse bias voltage ($-Vb2$) that is supplied from the second bias voltage supply unit 52 and is applied to the sixth high-frequency electrode 22b1. In order that the voltages applied to the third through sixth high-frequency electrodes (21a1, 21b1, 22a1, 22b1) are always negative voltage, the voltage is set such that Vb2, Vb3>$+\Delta V$, $\beta\Delta V$. The voltage damping rates $\alpha$, $\beta$ of the first and second voltage regulators 45, 46 are typically the same value, however, they could be different.

The reverse bias voltages ($-Vb2$, $-Vb3$) that are applied to the third and fourth high-frequency electrodes 21a1, 21b1 of the first sub Mach-Zehnder interferometer 21, and the reverse bias voltages ($-Vb3$, $-Vb2$) that are applied to the fifth and sixth high-frequency electrodes 22a1, 22b1 of the second sub Mach-Zehnder interferometer 22 are set as described below.

Figure 6:
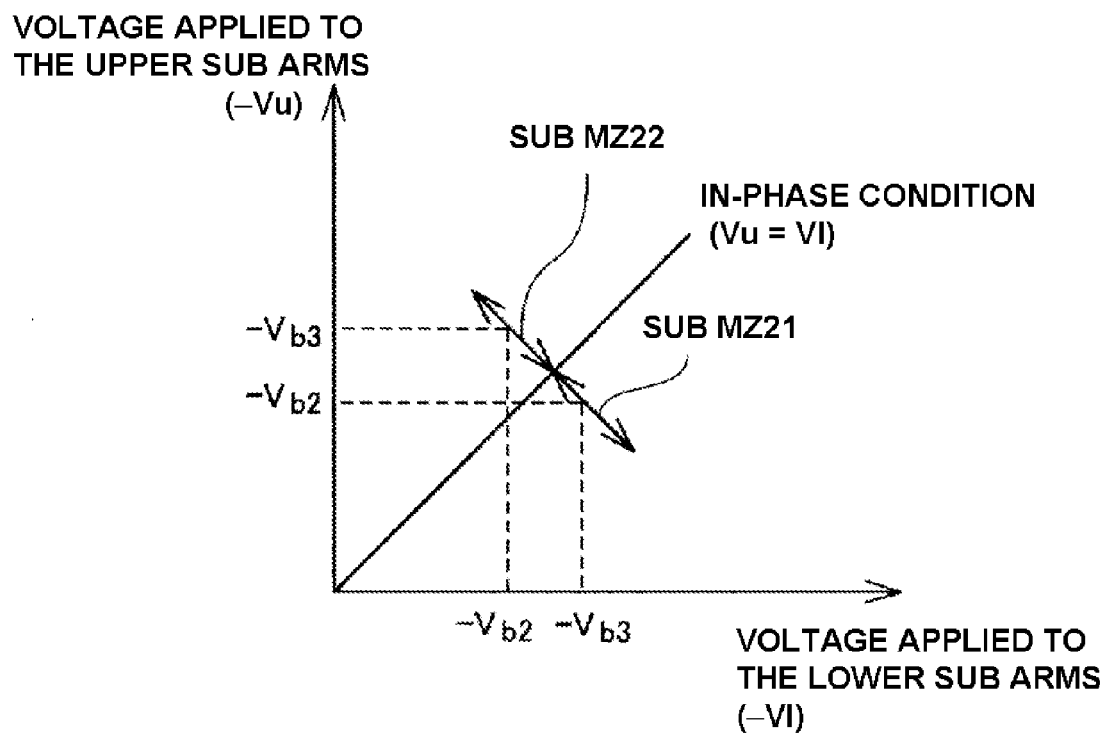
FIG. 6 is a diagram that explains the relationship between the reverse bias voltages that are applied to the high-frequency electrode of the upper optical waveguide path sub arm and to the high-frequency electrode of the lower optical waveguide path sub arm of a sub Mach-Zehnder interferometer in the DPSK optical phase modulating device in FIG. 5.

In other words, as illustrated in FIG. 6, the bias points (Vb2, Vb3) of the upper and lower sub optical waveguide path arms 21a, 21b of the first sub Mach-Zehnder interferometer 21, and the bias points (Vb3, Vb2) of the upper and lower sub optical waveguide path arms 22a, 22b of the second sub Mach-Zehnder interferometer 22, when Vu is taken to be the voltage that is applied to the high-frequency electrodes 21a1, 22a1 of the upper sub optical waveguide path arms 21a, 22a, and V1 is taken to be the voltage that is applied to the high-frequency electrodes 21b1, 22b1 of the lower sub optical waveguide path arms 21b, 22b, are at symmetrical positions near the straight line Vu=V1, which is a condition where the phases of the light travelling along the upper sub optical waveguide path arms 21a, 22a and the lower sub optical waveguide path arms 22a, 22b of the first and second sub Mach-Zehnder interferometers 21, 22 that are manufactured at an initial phase difference 0 at the used wavelength are the same phase, and are selected such that Vb2<Vb3.

When doing this, when the reverse direction voltages ($-Vu$, $-V1$) that are added to the upper and lower optical waveguide path arms 21a, 21b of the first sub Mach-Zehnder interferometer 21 pass through the first and second voltage regulators 45, 46 with ($-Vb2$, $-Vb3$) as base points, fluctuate by just the superimposed signal voltages ($-\alpha\Delta V$, $+\beta\Delta V$) and approach the straight line Vu=V1 that expresses the in-phase condition (when the optical fields of the sub optical waveguide path arms 21a, 21b are in phase), the reverse direction voltages that are added to the upper and lower sub optical waveguide path arms 22a, 22b of the second sub Mach-Zehnder interferometer 22 pass through the first and second voltage regulators 45, 46 with ($-Vb3$, $-Vb2$) as base points, fluctuate by just the superimposed signal voltages ($-\alpha\Delta V$, $+\beta\Delta V$) and move away from the straight line Vu=V1 that expresses the in-phase condition (the phases of the optical fields of the sub optical waveguide path arms 22a, 22b are separated). Conversely, when the reverse direction voltages ($-Vu$, $-V1$) that are added to the upper and lower optical waveguide path arms 22a, 22b of the second sub Mach-Zehnder interferometer 22 pass through the first and second voltage regulators 45, 46 with ($-Vb3$, $-Vb2$) as base points, fluctuate by just the superimposed signal voltages ($-\alpha\Delta V$, $+\beta\Delta V$) and approach the straight line Vu=V1 that expresses the in-phase condition (when the optical fields of the sub optical waveguide path arms 22a, 22b are in phase), the reverse direction voltages that are added to the upper and lower sub optical waveguide path arms 21a, 21b of the first sub Mach-Zehnder interferometer 21 pass through the first and second voltage regulators 45, 46 with ($-Vb3$, $-Vb2$) as base points, fluctuate by just the superimposed signal voltages ($-\alpha\Delta V$, $+\beta\Delta V$) and move away from the straight line Vu=V1 that expresses the in-phase condition (the phases of the optical fields of the sub optical waveguide path arms 21a, 21b separate).

Figure 7:
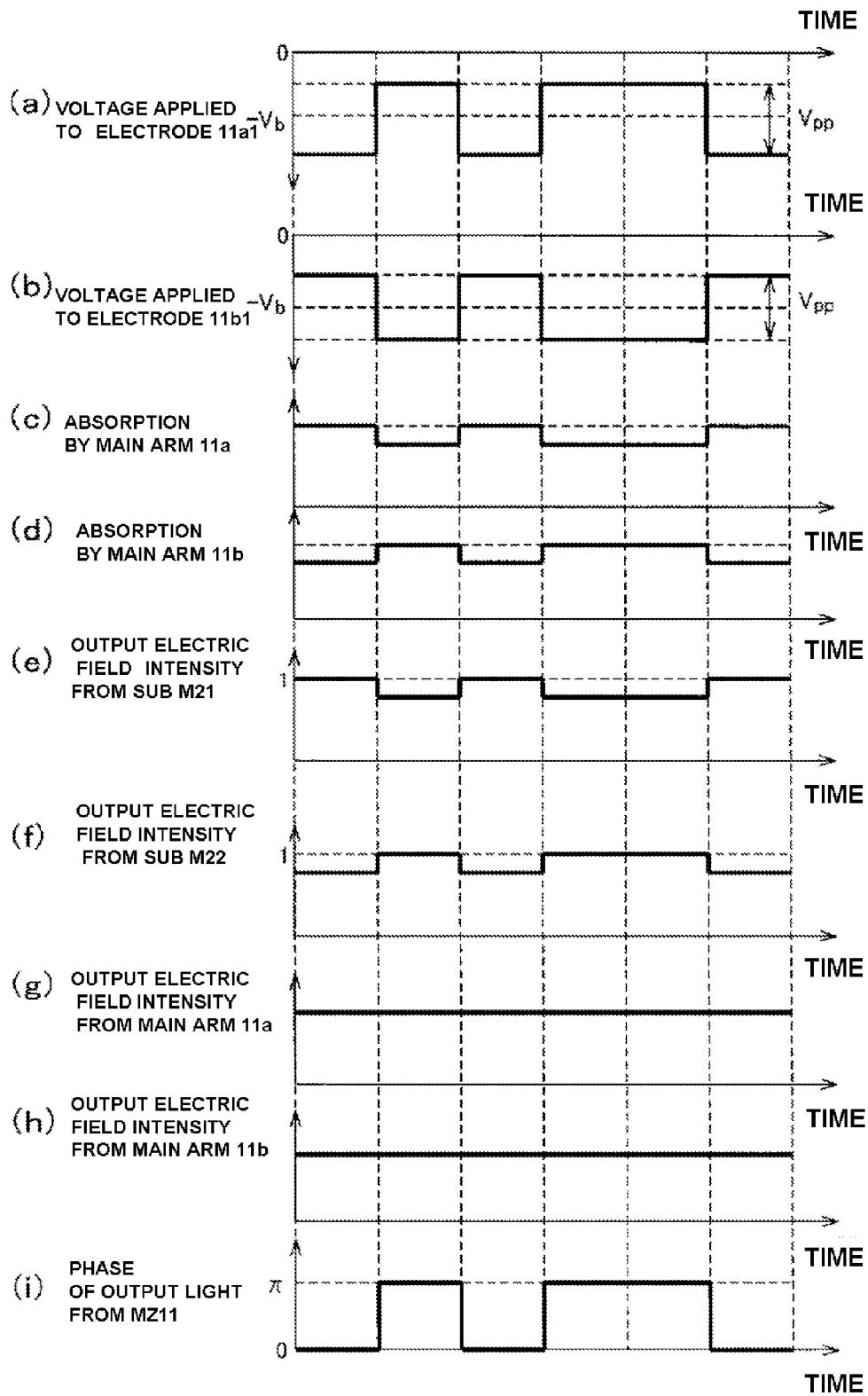
FIGS. 7A to 7I are diagrams that illustrate the change in the sate (applied voltage) of each part of the DPSK optical phase modulating device when the signal from the signal generator changes.

Next, the operation of this DPSK optical phase modulating device 100A will be explained. FIG. 7 is a diagram illustrating change in the state of each of the parts (changed by applied voltage) when the signal from the signal generator 43 changes, and FIG. 8 is a table that summarizes the operation on the DPSK optical phase modulating device 100A.

First, in the DSPK optical phase modulating device of this embodiment, in order to express phase "0" ((i) of FIG. 7, FIG. 8), the voltage output from the signal generator 43 is taken to be −ΔV. Here, the voltage output from the inverted signal generator 44 is +ΔV, and the first bias voltage supply unit 51 superimposes the reverse bias voltage (−Vb1) onto that voltages and applies the voltages −Vb1−ΔV, −Vb1+ΔV to the first and second high-frequency electrodes 11a1, 11b1 (see (a) and (b) of FIG. 7, FIG. 8). In this case, the reverse direction voltage that is applied to the first main optical waveguide path arm 11a is larger than the reverse direction voltage that is added to the second main optical waveguide path arm 11b, so the light absorption by the first main optical waveguide path arm 11a becomes larger than the light absorption by the second main optical waveguide path arm 11b (see (c) and (d) of FIG. 7, FIG. 8).

On the other hand, the voltage −Vb2−αΔV is applied to the third high-frequency electrode 21a1 of the first sub Mach-Zehnder interferometer 21 that is provided in the first main optical waveguide path arm 11a via the first voltage regulator 45 (voltage damping rate α) and the second bias voltage supply unit 52, and the voltage −Vb3+βΔV is applied to the fourth high-frequency electrode 21b1 of the first sub Mach-Zehnder interferometer 21 via the second voltage regulator 46 (voltage damping rate β) and the third bias voltage supply unit 53 (see FIG. 8). Therefore, in referencing FIG. 6, the reverse direction voltages that are added to the sub optical waveguide path arms 21a, 21b of the first sub Mach-Zehnder interferometer 21, with (−Vu, −V1)=(−Vb2, −Vb3) as base points, changes in the direction toward the in-phase condition: Vu=V1, so the light from each of the sub optical waveguide path arms 21a, 21b is combined and intensified, and the output from the first sub Mach-Zehnder interferometer 21 becomes larger (see (e) of FIG. 7, FIG. 8).

On the other hand, the voltage −Vb3−αΔV is applied to the fifth high-frequency electrode 22a of the second sub Mach-Zehnder interferometer 22 that is provided in the second main optical waveguide path arm 11b via the first voltage regulator 45 (voltage damping rate α) and the third bias voltage supply unit 53, and the voltage −Vb2+βΔV is a applied to the sixth high-frequency electrode 22b1 of the second sub Mach-Zehnder interferometer 22 via the second voltage regulator 46 (voltage damping rate β) and the second bias voltage supply unit 52 (see FIG. 8). Therefore, referencing FIG. 6, the reverse direction voltages that are added to each of the sub optical waveguide path arms 22a, 22b of the second sub Mach-Zehnder interferometer 22, with (−Vu, −V1)=(−Vb3, −Vb2) as base points, change in the direction moving away from the in-phase condition: Vu=V1, so the output of the second Mach-Zehnder interferometer 22 becomes small (see (f) of FIG. 7, FIG. 8).

Therefore, the drop in light intensity due to large light absorption by the first main optical waveguide path arm 11a is compensated by the output from the first sub Mach-Zehnder interferometer 21 that is provided in the first main optical waveguide path arm 11a becoming large, and the light intensity of the second main optical waveguide path arm 11a having small light absorption is compensated by the output from the second sub Mach-Zehnder interferometer 22 that is provided in the second main optical waveguide path 11b becoming small (see (g) and (h) of FIG. 7).

Next, in order to express the phase "π" (see (i) of FIG. 7, FIG. 8), the voltage output of the signal generator 43 is taken to be +ΔV. Here, the voltage output from the inverted signal generated is −ΔV, the first bias voltage supply unit 51 superimposes the reverse bias voltage (−Vb1) and applies the voltages −Vb1+ΔV, −Vb1−ΔV to the first and second high-frequency electrodes 11a1, 11b1 (see (a) and (b) of FIG. 7, FIG. 8). In this case, the reverse direction voltage that is added to the first main optical waveguide path arm 11a is smaller than the reverse direction voltage that is added to the second main optical waveguide path arm 11b, so the light absorption by the first main optical waveguide path arm 11a is less than the light absorption by the second main optical waveguide path 11b (see (c) and (d) of FIG. 7, FIG. 8).

On one hand, the voltage −Vb2+αΔV is applied to the third high-frequency electrode 21a1 of the first sub Mach-Zehnder interferometer 21 that is provided in the first main optical waveguide path arm 11a via the first voltage regulator 45 (voltage damping rate α) and the second bias voltage supply unit 52, and the voltage −Vb3−βΔV is applied to the fourth high-frequency electrode 21b1 of the first sub Mach-Zehnder interferometer 21 via the second voltage regulator 46 (voltage damping rate β) and third bias voltage supply unit 53 (see FIG. 8). Therefore, referencing FIG. 6, the reverse direction voltage that is added to the sub optical waveguide path arms 21a, 21b of the first sub Mach-Zehnder interferometer 21, with (−Vu, −V1)=(−Vb2, −Vb3) as base points, changes in the direction away from the in-phase condition Vu=V1, so the output from the first sub Mach-Zehnder interferometer 21 becomes small (see (e) of FIG. 7, FIG. 8).

On the other hand, the voltage −Vb3+αΔV is applied to the fifth high-frequency electrode 22a1 of the second sub Mach-Zehnder interferometer 22 that is provided in the second main optical waveguide path arm 11b via the first voltage regulator 45 (voltage damping rate α) and the third bias voltage supply unit 53, and the voltage −Vb2−βΔV is applied to the sixth high-frequency electrode 22b of the first sub Mach-Zehnder interferometer 22 via the second voltage regulator 46 (voltage damping rate β) and second bias voltage supply unit 52 (see FIG. 8). Therefore, referencing FIG. 6, the reverse direction voltage that is added to the sub optical waveguide path arms 22a, 22b of the second sub Mach-Zehnder interferometer 22, with (−Vu, −V1)=(−Vb3, −Vb2) as base points, changes in the direction toward the in-phase condition Vu=V1, so the light from the sub optical waveguide paths 22a, 22b is combined and intensified, and the output from the second sub Mach-Zehnder interferometer 22 becomes large (see (f) of FIG. 7, FIG. 8).

Therefore, the drop in light intensity due to the large light absorption that occurs in the second main optical waveguide path 11b is compensated by the increase in the output from the second sub Mach-Zehnder interferometer 22 that is provided in the second main optical waveguide path arm 11b, and the light intensity of the main optical waveguide path arm 11a in which there is little absorption is compensated by the decrease in output from the first sub Mach-Zehnder interferometer 21 that is provided in the first main optical waveguide path 11 (see FIGS. 7(g) and 7(h)).

Figure 9:
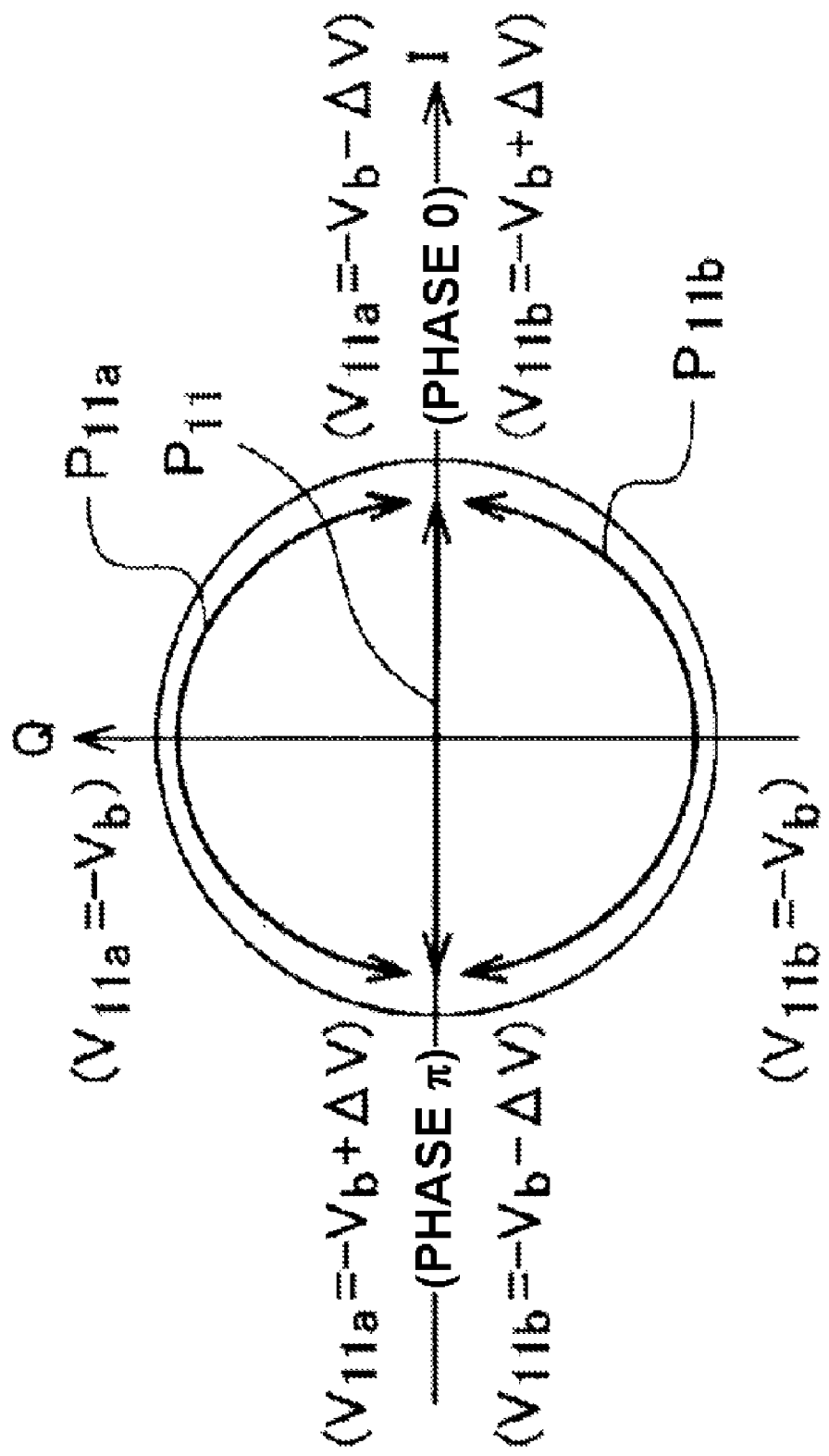
FIG. 9 is a diagram that illustrates in polar coordinates the electric field of each optical waveguide path arm and a combined electric field in a DPSK optical phase modulating device that uses the DPSK optical phase modulator of a first embodiment of the present invention.

Therefore, in the case of expressing either phase "0" or "π", the difference in the amount of light absorption due to applying voltage to the first or second high-frequency electrodes 11a1, 11b1 is compensated by the difference in the intensity of the light output from the first and second sub Mach-Zehnder interferometers 21, 22. As a result, the amplitudes of the optical fields P11a, P11b of both main optical waveguide paths 11a, 11b are nearly the same regardless of the amount of voltage added to the first and second high-frequency electrodes 11a1, 11b1, and it is possible to suppress the occurrence of an orthogonal component in the optical field P11, which is a combination of these optical fields. This is illustrated in FIG. 9. Therefore, even when the voltage signal from the signal generator 43 changes at high speed, it is possible to prevent time differentiation of the phase angle of the optical field P11, or in other words, it is possible to prevent widening of the frequency band, and thus degradation of the transmission signal due to dispersion of optical fiber is prevented.

(Variation of an Optical Phase Modulating Device)

Figure 10:
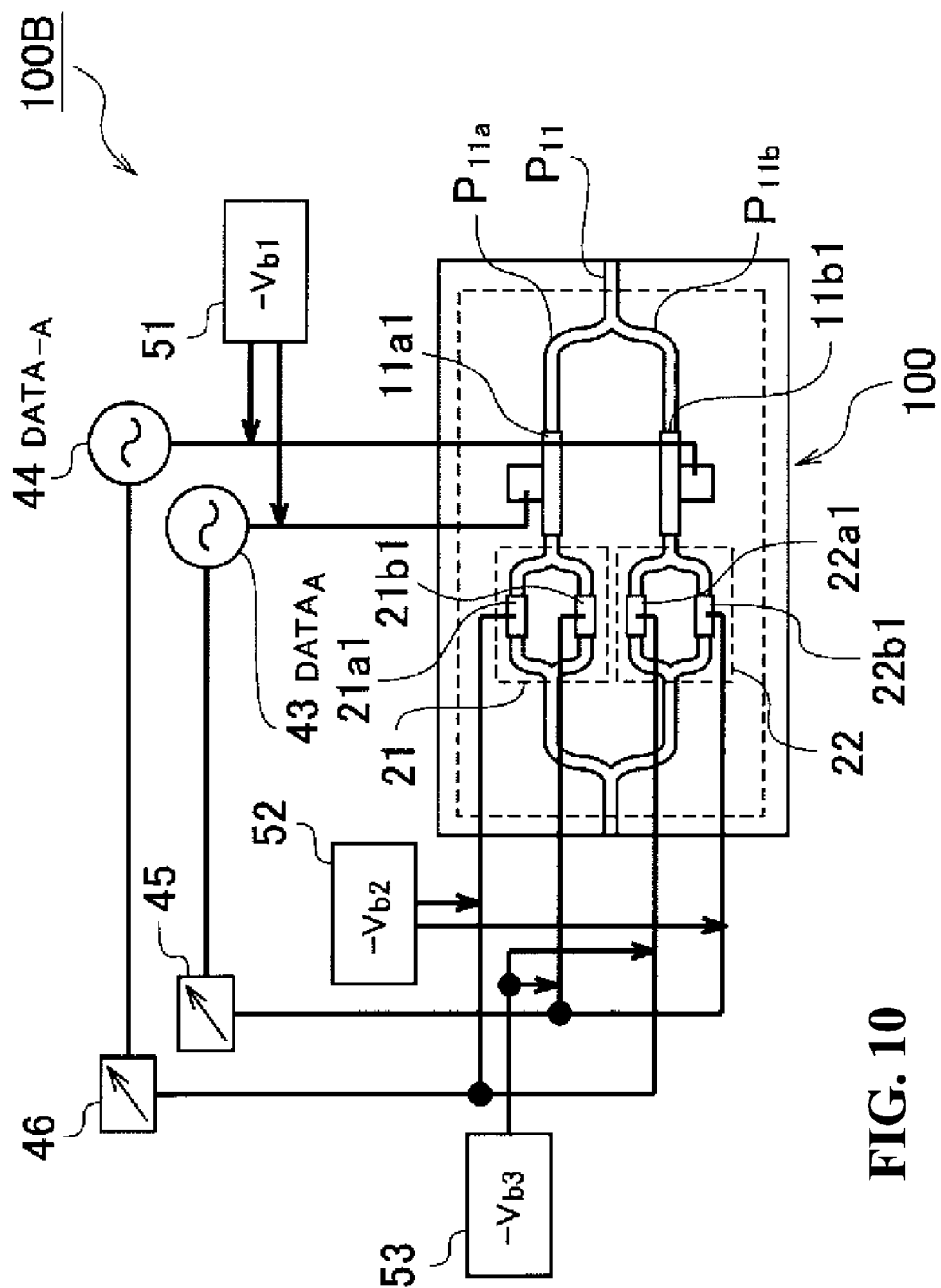
FIG. 10 is a block diagram that schematically illustrates a variation of a DPSK optical phase modulating device that uses the DPSK optical phase modulator of a first embodiment of the present invention.

FIG. 10 is a block diagram that schematically illustrates a variation of a DPSK optical phase modulating device that uses the DPSK optical phase modulator of the first embodiment of the invention. The DPSK optical phase modulating device 100B of the variation illustrated in FIG. 10 is different from the DPSK optical phase modulating device illustrated in FIG. 5 in that the connected state of the first and second voltage regulators 45, 46, and the third through sixth high-frequency electrodes 21$a$1, 21$b$1, 22$a$1, 22$b$1, as well as the relationship between the amplitude of the bias voltages Vb2 and Vb3 differ.

In other words, in this variation, the output voltage ($\pm\alpha\Delta V$) from the first voltage regulator 45 is superimposed onto the reverse bias voltage ($-$Vb3) that is supplied from the third bias voltage supply unit 53 and applied to the fourth high-frequency electrode 21$b$1, and is also superimposed with the second reverse bias voltage ($-$Vb2) that is supplied from the second bias voltage supply unit 52 and applied to the sixth high-frequency electrode 22$b$1. In addition, the output voltage ($\pm\beta\Delta V$) from the second voltage regulator 46 is superimposed onto the second reverse bias voltage ($-$Vb2) that is supplied from the second bias voltage supply unit 52 and applied to the third high-frequency electrode 21$a$1, and is also superimposed with the third reverse bias voltage ($-$Vb3) that is supplied from the third bias voltage supply unit 53 and applied to the fifth high-frequency electrode 22$a$1.

Moreover, in this variation, the reverse bias voltages ($-$Vb2, $-$Vb3) that are added to the third and fourth high-frequency electrodes 21$a$1, 21$b$1 of the first sub Mach-Zehnder interferometer 21, and the reverse bias voltages ($-$Vb3, $-$Vb2) that are added to the fifth and sixth high-frequency electrodes 22$a$1, 22$b$1 of the second sub Mach-Zehnder interferometer 22 are set as described below.

Figure 11:
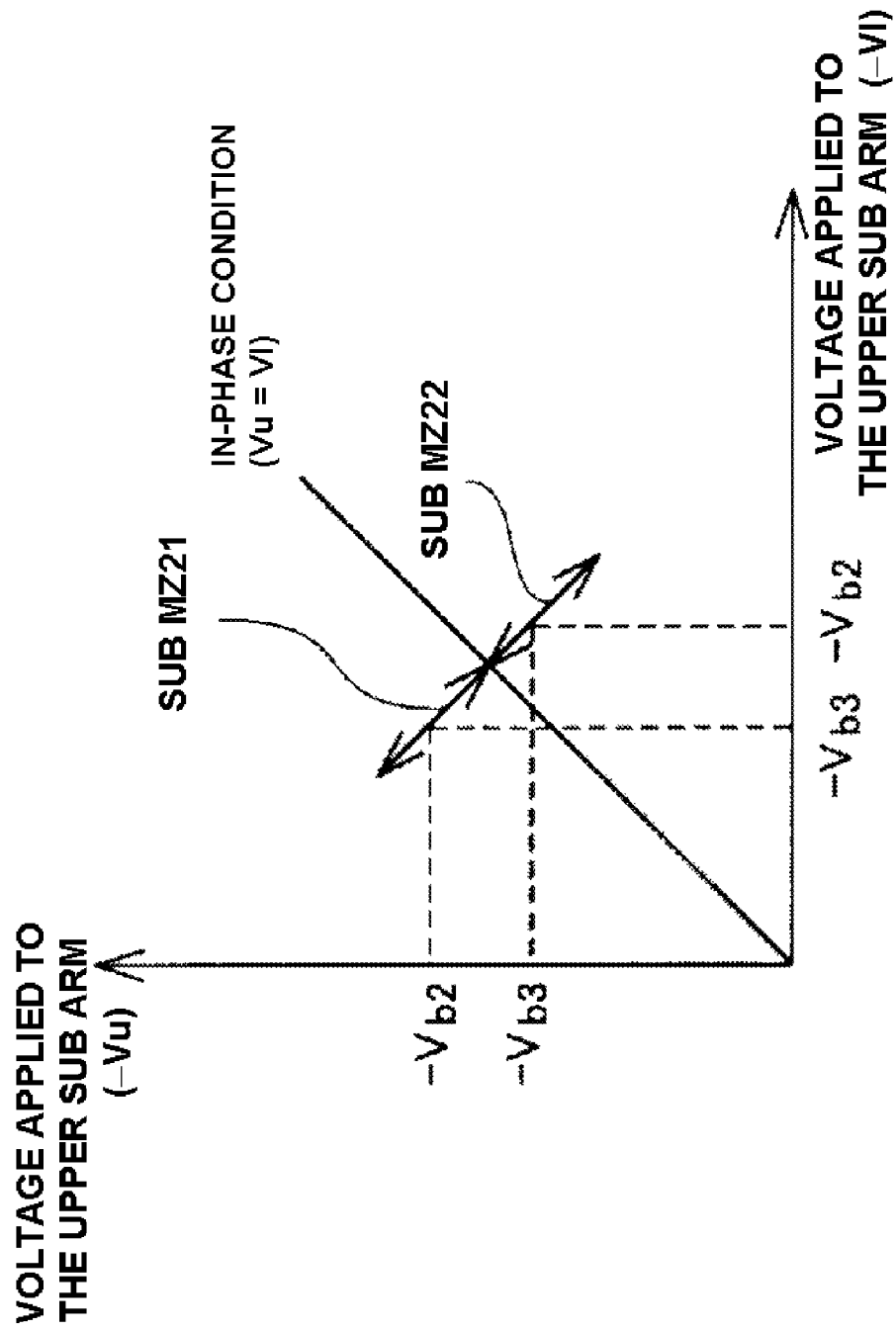
FIG. 11 is a diagram that explains the relationship between the reverse bias voltages that are applied to the high-frequency electrode of the upper optical waveguide path sub arm and to the high-frequency electrode of the lower optical waveguide path sub arm of a sub Mach-Zehnder interferometer in the DPSK optical phase modulating device in FIG. 10.

In other words, as illustrated in FIG. 11, the bias points (Vb2, Vb3) of the upper and lower sub optical waveguide path arms 21$a$, 21$b$ of the first sub Mach-Zehnder interferometer 21, and the bias points (Vb3, Vb2) of the upper and lower sub optical waveguide paths 22$a$, 22$b$ of the second sub Mach-Zehnder interferometer 22, when Vu is taken to be the voltage applied to the high-frequency electrodes 21$a$1, 22$a$1 of the upper sub optical waveguide path arms 21$a$, 22$a$, and V1 is taken to be the voltage applied to the high-frequency electrodes 21$b$1, 22$b$1 of the lower sub optical waveguide path arms 21$b$, 22$b$, are located at symmetrical positions near the straight line Vu=V1 and selected so that Vb2>Vb3.

Here, as the reverse direction voltages ($-$Vu, $-$V1) that are added to the upper and lower sub optical waveguide paths 21$a$, 21$b$ of the first sub Mach-Zehnder interferometer 21 pass through the first and second voltage regulators 45, 46, with ($-$Vb2, $-$Vb3) as base points and fluctuating by just the superimposed signal voltages (+$\beta\Delta V$, $-\alpha\Delta V$), approach the straight light Vu=V1 that indicates the in-phase condition (when the optical fields of the sub optical waveguide paths 21$a$, 21$b$ are in phase), the reverse direction voltages that are added to the upper and lower sub optical waveguide paths 22$a$, 22$b$ of the second sub Mach-Zehnder interferometer 22 pass through the first and second voltage regulators 45, 46, with ($-$Vb3, $-$Vb2) as base points and fluctuating by just the superimposed signal voltages (+$\beta\Delta V$, $-\alpha\Delta V$), move away from the straight light Vu=V1 that indicates the in-phase condition (the phases of the optical fields of the sub optical waveguide paths 22$a$, 22$b$ are separated). Conversely, as the reverse direction voltages ($-$Vu, $-$V1) that are added to the upper and lower sub optical waveguide paths 22$a$, 22$b$ of the second sub Mach-Zehnder interferometer 22 pass through the first and second voltage regulators 45, 46, with ($-$Vb3, $-$Vb2) as base points and fluctuating by just the superimposed signal voltages ($-(3\Delta V$, +$\alpha\Delta V$), approach the straight light Vu=V1 that indicates the in-phase condition (when the optical fields of the sub optical waveguide paths 22$a$, 22$b$ are in phase), the reverse direction voltages that are added to the upper and lower sub optical waveguide paths 21$a$, 21$b$ of the first sub Mach-Zehnder interferometer 21 pass through the first and second voltage regulators 45, 46, with ($-$Vb2, $-$Vb3) as base points and fluctuating by just the superimposed signal voltages ($-(3\Delta V$, +$\alpha\Delta V$), move away from the straight light Vu=V1 that indicates the in-phase condition (the phases of the optical fields of the sub optical waveguide paths 21$a$, 21$b$ are separated).

Next, the operation of the DPSK optical phase modulating device of this variation will be explained using the FIG. 11 in the place of FIG. 6, and FIG. 12 in the place of FIG. 8.

Figure 12:
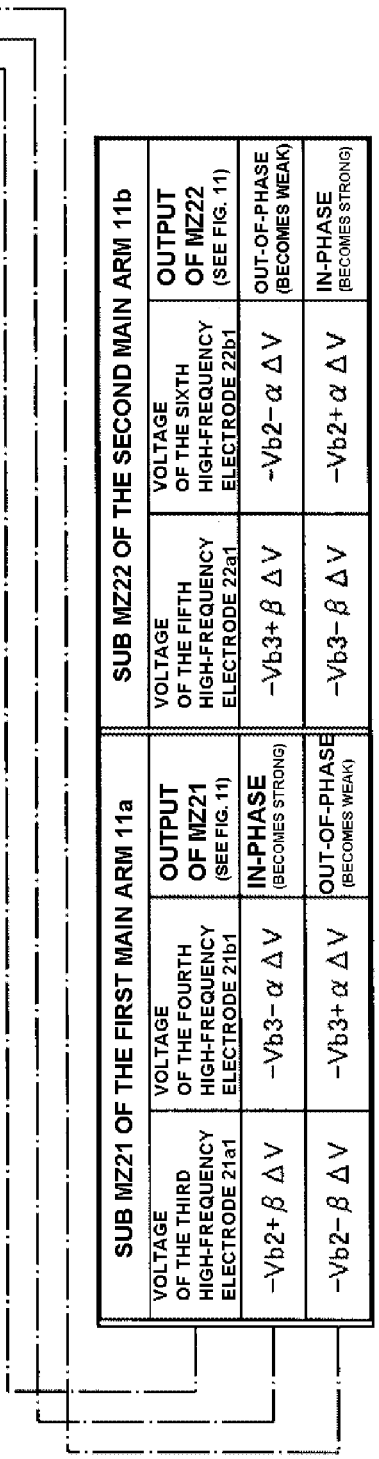
FIG. 12 is a diagram (Table 2) that explains the operation of a variation of the DPSK optical phase modulating device that uses the DPSK optical phase modulator of a first embodiment of the present invention.

FIG. 12 is a table summarizing the operation of the DPSK optical phase modulating device 100B.

First, in the DPSK optical phase modulating device of this embodiment, in order to express phase "0" (see FIG. 7($i$), FIG. 12) the output voltage of the signal generator 43 is taken to be $-\Delta V$. Here, the voltage output of the inverted signal generator 44 is +$\Delta V$, and reverse bias voltage $-$Vb1 from the first bias voltage supply unit 51 is superimposed onto these voltages such that the voltages $-$Vb1$-\Delta V$ and $-$Vb1+$\Delta V$ are applied to the first and second high-frequency electrodes 11$a$1, 11$b$1 (see FIGS. 7($a$) and 7($b$), FIG. 12). In this case, the reverse direction voltage that is added to the first main optical waveguide path 11$a$ is greater than the reverse direction voltage that is added to the second optical waveguide path 11$b$, so the light absorption by the first main optical waveguide path 11$a$ is larger than the light absorption by the second main optical waveguide path 11$b$ (see FIGS. 7($c$) and 7($d$), FIG. 12).

On one hand, the voltage $-$Vb2+$\beta\Delta V$ is applied to the third high-frequency electrode 21$a$1 of the first sub Mach-Zehnder interferometer 21 that is provided in the first main optical waveguide path 11$a$ via the second voltage regulator 46 (voltage damping rate $\beta$) and the second bias voltage supply unit 52, and the voltage $-$Vb3$-\alpha\Delta V$ is applied to the fourth high-frequency electrode 21$b$1 of the first Mach-Zehnder interferometer 21 via the first voltage regulator 45 (voltage damping rate $\alpha$) and third bias voltage supply unit 53 (see FIG. 12). Therefore, referencing FIG. 11, the reverse direction voltage that is added to the sub optical waveguide paths 21$a$, 21$b$ of the first sub Mach-Zehnder interferometer 21, with ($-$Vu, $-$V1)=($-$Vb2, $-$Vb3) as base points, changes in the direction toward the in-phase condition Vu=V1, so the light from the sub optical waveguide paths 21$a$, 21$b$ is combined and intensified, and the output from the first sub Mach-Zehnder interferometer 21 becomes large (see FIG. 7($e$), FIG. 12).

On the other hand, the voltage $-$Vb3+$\beta\Delta V$ is applied to the fifth high-frequency electrode 22$a$1 of the second sub Mach-Zehnder interferometer 22 that is provided in the second main optical waveguide path 11$b$ via the second voltage regulator 46 (voltage damping rate $\beta$) and the third bias voltage supply unit 53, and the voltage $-$Vb2$-\alpha\Delta V$ is applied to the sixth high-frequency electrode 22$b$1 of the second Mach-Zehnder interferometer 22 via the first voltage regulator 45 (voltage damping rate $\alpha$) and second bias voltage supply unit 52 (see FIG. 12). Therefore, referencing FIG. 11, the reverse direction voltage that is added to the sub optical waveguide paths 22$a$, 22$b$ of the second sub Mach-Zehnder interferometer 22, with ($-$Vu, $-$V1)=($-$Vb3, $-$Vb2) as base points, changes in the direction away from the in-phase condition Vu=V1, so the output from the second sub Mach-Zehnder interferometer 22 becomes small (see FIG. 7(f), FIG. 12).

Therefore, the decrease in the light intensity due to the large light absorption that occurs in the first main optical waveguide path 11a is compensated by the increase in the output from the sub Mach-Zehnder interferometer 21 that is provided in the first main optical waveguide path 11a, and the light intensity from the second optical waveguide path 11b that has small light absorption is compensated by the decrease in output from the second Mach-Zehnder interferometer 22 that is provided in the second main optical waveguide path 11b (see FIGS. 7(g) and 7(h)).

Next, in order to express phase "π" (see FIG. 7(i), FIG. 12), the voltage output from the signal generator 43 is taken to be +ΔV. Here, the voltage output from the inverted signal generator 44 is taken to be −ΔV, and the first bias voltage supply unit 51 superimposes the reverse bias voltage (−Vb1) onto these voltages such that the voltages −Vb1+ΔV and −Vb1−ΔV are applied to the first and second high-frequency electrodes 11a1, 11b1 (see FIGS. 7A and 7B, FIG. 12). In this case, the reverse direction voltage that is added to the first main optical waveguide path arm 11a is less than the reverse direction voltage added to the second main optical waveguide path arm 11b, so the light absorption by the first main optical waveguide path arm 11a is less than the light absorption by the second main optical waveguide path arm 11b (see FIGS. 7c and 7D, FIG. 12).

On one hand, the voltage −Vb2−βΔV is applied to the third high-frequency electrode 21a1 of the first Mach-Zehnder interferometer 21 that is provided in the first main optical waveguide path arm 11a via the second voltage regulator 46 (voltage damping rate β) and the second bias voltage supply unit 52, and the voltage −Vb3+αΔV is applied to the fourth high-frequency electrode 21b1 of the first Mach-Zehnder interferometer 21 via the first voltage regulator 45 (voltage damping rate α) and third bias voltage supply unit 53 (see FIG. 12). Therefore, referencing FIG. 11, the reverse direction voltages that are added to the sub optical waveguide paths 21a, 21b of the first sub Mach-Zehnder interferometer 21, with (−Vu, −V1)=(−Vb2, −Vb3) as base points, changes in the direction away from the in-phase condition Vu=V1, so the output from the first Mach-Zehnder interferometer 21 becomes small (see FIG. 7(e), FIG. 12).

On the other hand, the voltage −Vb3−βΔV is applied to the fifth high-frequency electrode 22a1 of the second Mach-Zehnder interferometer 22 that is provided in the second main optical waveguide path arm 11b via the second voltage regulator 46 (voltage damping rate β) and the third bias voltage supply unit 53, and the voltage −Vb2+αΔV is applied to the sixth high-frequency electrode 22b1 of the second Mach-Zehnder interferometer 22 via the first voltage regulator 45 (voltage damping rate α) and second bias voltage supply unit 52 (see FIG. 12). Therefore, referencing FIG. 11, the reverse direction voltages that are added to the sub optical waveguide paths 22a, 22b of the second sub Mach-Zehnder interferometer 22, with (−Vu, −V1)=(−Vb2, −Vb3) as base points, changes in the direction toward the in-phase condition Vu=V1, so the light from the sub optical waveguide path arms 22a, 22b is combined and intensified, and the output from the second Mach-Zehnder interferometer 22 becomes large (see FIG. 7(f), FIG. 12).

Therefore, the decrease in light intensity due to large light absorption that occurs in the second main optical waveguide path 11b is compensated by the increase in output from the second sub Mach-Zehnder interferometer 22 that is provided in the second main optical waveguide path 11b, and the light intensity of the first main optical waveguide path 11a having small light absorption is compensated by the decrease in output from the first sub Mach-Zehnder interferometer 21 that is provided in the first main optical waveguide path 11a (see FIGS. 7(g) and 7(h)).

Consequently, when expressing either the "0" or "π", the difference between the light absorption that occurs due to the application of voltage to the first or second high-frequency electrodes 11a1, 11b1 is compensated by the difference in the output light intensity from the first and second sub Mach-Zehnder interferometers 21, 22. As a result, the amplitudes of the optical fields P11a, P11b of both main optical waveguide path arms 11a, 11b become nearly the same regardless of the voltage added to the first and second high-frequency electrodes 11a1, 11b1, and it is possible to suppress the generation of an orthogonal component in the optical field P11, which is a combination of these optical fields. This is illustrated in FIG. 9. Therefore, even when the voltage signal from the signal generator 43 changes at high speed, it is possible to prevent time differentiation of the phase angle of the optical field P11, or in other words, it is possible to prevent the frequency bandwidth, from becoming wide, and thus it is possible to prevent degradation of transmission signals due to dispersion of optic fiber.

Embodiment 2

Figure 13:
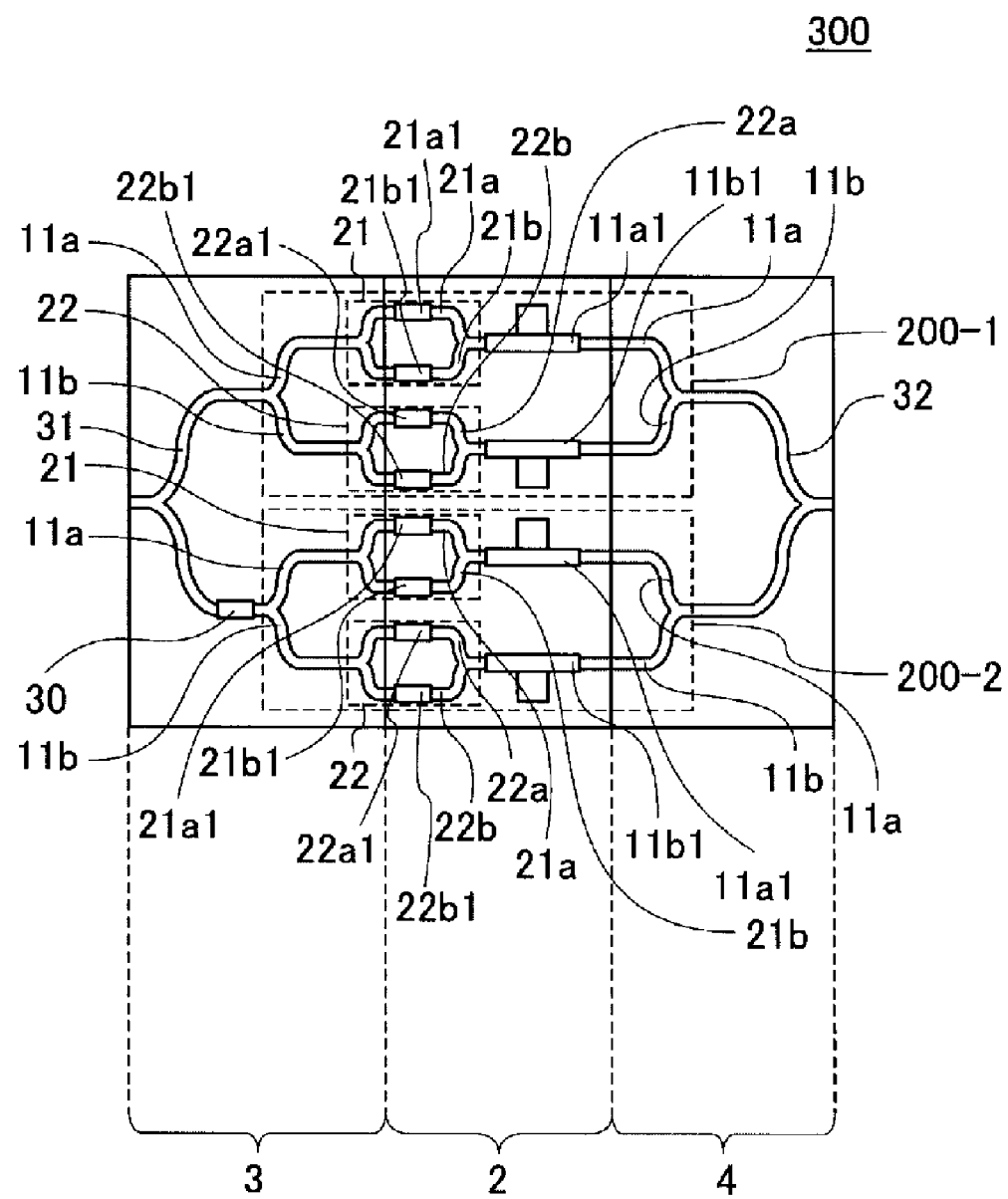
FIG. 13 is a top view that schematically illustrates the construction of a DQPSK optical phase modulator, which is the optical phase modulator of a second embodiment of the present invention.

FIG. 13 will be used to explain the construction of an optical phase modulator of a second embodiment of the present invention. FIG. 13 is a top view that schematically illustrates the construction of a DQPSK optical phase modulator as one example of 4-value optical phase modulators of a second embodiment of the invention. As illustrated in FIG. 13, the DQPSK optical phase modulator 300 is such that two of the DPSK optical phase modulators 200 explained as a variation of the first embodiment (200-1, 200-2) are connected in parallel using a branching optical waveguide path 31 and combining optical waveguide path 32, where a phase shifter 30 that shifts the phase of the passing light by just π/2 is provided in one of the branches of the branching optical waveguide path 31. The phase shifter 30 could also be provided in one of the branches of the combining optical waveguide path 32.

Of the DQPSK optical phase modulator 300, the area 2, in which first through sixth high-frequency electrodes 11a1, 11b1, 21a1, 21b1, 22a1, 22b1 of a main Mach-Zehnder interferometer 11 of the DPSK optical phase modulator 200-1, and first through sixth high-frequency electrodes 11a1, 11b1, 21a1, 21b1, 22a1, 22b1 of a main Mach-Zehnder interferometer 11 of the DPSK optical phase modulator 200-2 are formed, is constructed using semiconductor optical waveguide paths, and the areas 3 and 4, which include the branching optical waveguide path 31 and combining optical waveguide path 32, are constructed using silica optical waveguide paths. With this kind of construction, it is possible to shorten the length of the semiconductor optical waveguide paths area 2, so it is possible to keep loss in the semiconductor low. In addition, the combining/dividing units and optical waveguide paths can be manufactured using silica optical waveguide paths, which have better precision, and by keeping the number of combining/dividing units that are manufactured using semiconductor optical waveguide paths to a minimum, it is possible to reduce the increase of extinction degradation due to stray light and insertion loss.

In the embodiment described above, an example is given in which two of the DPSK optical phase modulators 200 illustrated in FIG. 3 having silica optical waveguide path area 3, 4 are arranged in parallel, however, two of the DPSK optical phase modulators 100 illustrated in FIG. 1 comprising just semiconductor optical waveguide paths could also be arranged in parallel.

(Optical Phase Modulating Device)

Figure 14:
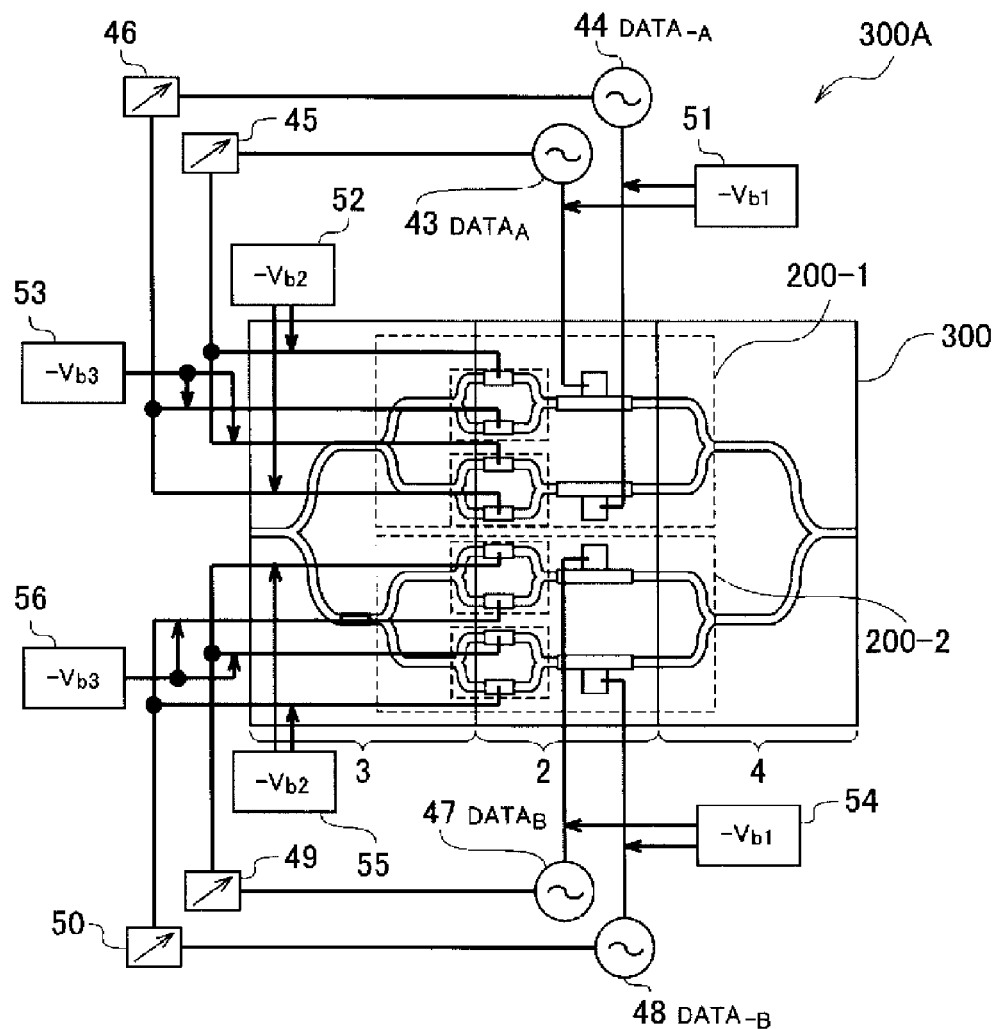
FIG. 14 is a block diagram that schematically illustrates a DQPSK optical phase modulating device that uses the DQPSK optical phase modulator of a second embodiment of the present invention.

Next, a 4-value optical phase modulating device that uses the 4-value optical phase modulator of the second embodiment of the invention will be explained. FIG. 14 is a block diagram that schematically illustrates a DQPSK optical phase modulating device that uses a DPSK optical phase modulator as one example of a 4-value optical phase modulating device of the second embodiment of the invention. As illustrated in FIG. 14, in the DQPSK optical phase modulating device 300A, a signal generator, an inverted signal generator, first and second voltage regulators, and first through third bias voltage supply units are prepared for both of the DPSK optical phase modulators 200-1, 200-2 of the DQPSK optical phase modulator 300, and these are wired as illustrated in FIG. 5. In other words, in the DQPSK optical phase modulating device 300A, two DPSK optical phase modulating devices that use a DPSK optical phase modulator 200 as illustrated in FIG. 3 are prepared, and the DPSK optical phase modulators 200-1, 200-2 are connected in parallel using a branching optical waveguide path 31 and combining optical waveguide path 32. Needless to say, one or both of the DPSK optical phase modulators 200-1, 200-2 of the DQPSK optical phase modulating device 300 may also be wired as illustrated in FIG. 10.

As explained for the first embodiment, in the DPSK optical phase modulator 200-1 of this DQPSK optical phase modulating device 300A, the occurrence of an orthogonal electric field component due to the difference in voltage applied to the first and second high-frequency electrodes 11a1, 11b1 from the first and second sub Mach-Zehnder interferometers 21, 22 is suppressed, and optical phase modulation is performed for the two values "0" and "π" according to the signal from the signal generator 43. In addition, similarly in the DPSK optical phase modulator 200-2 to which a π/2 phase shifter 30 is connected, the occurrence of an orthogonal electric field component due to the difference in voltage applied to the first and second high-frequency electrodes 11a1, 11b1 from the first and second sub Mach-Zehnder interferometers 21, 22 is suppressed, and optical phase modulation is performed for the two values "π/2" and "3π/2" according to the signal from the signal generator 47. By combining these lights, the DQPSK optical phase modulating device 300A outputs light having the phases "π/4", "3π/4", "5π/4" and "7π/4".

Therefore, even when the voltage signals from the signal generators 43, 47 change at high speed, it is possible to prevent time differentiation of the phase angle of the electric field of the combined light, in other words, prevent the frequency bandwidth, from becoming wide, thus it is possible to prevent degradation of transmission signals due to dispersion of optic fiber.

Embodiment 3

The optical phase modulator or optical phase modulating device of the present invention can be universally applied as described below to a higher-degree of multi-value optical modulators than the 4-value phase modulator (DQPSK) explained for the second embodiment.

In other words, two branch dividers can be connected in an n-level cascade connection (where n is a natural number) to form a branching optical waveguide path having $2^n$ number of branch ends, where $2^n$ number of 2-value optical phase modulators or 2-value optical phase modulating devices are connected in parallel to the $2^n$ number of branch ends. In addition, a combining optical waveguide path comprising two-branch combining units that are connected in an n-level cascade connection is connected to the output ends of the $2^n$ number of 2-value optical phase modulators or 2-value optical phase modulating devices to combine the output light from all of the 2-value optical phase modulators or 2-value optical phase modulating devices. A π/2 phase shifter is provided for every other one of the last branch ends of the branching optical wave guide path or combining optical waveguide path. Here, of the $2^n$ number of 2-value optical phase modulators or 2-value optical phase modulating devices for which there is a problem of the occurrence of an orthogonal component due to absorption of light caused by applying voltage, 2-value optical phase modulators 100, 200 or 2-value optical phase modulating devices 100A, 100B explained for the first embodiment are applied.

Figure 15:
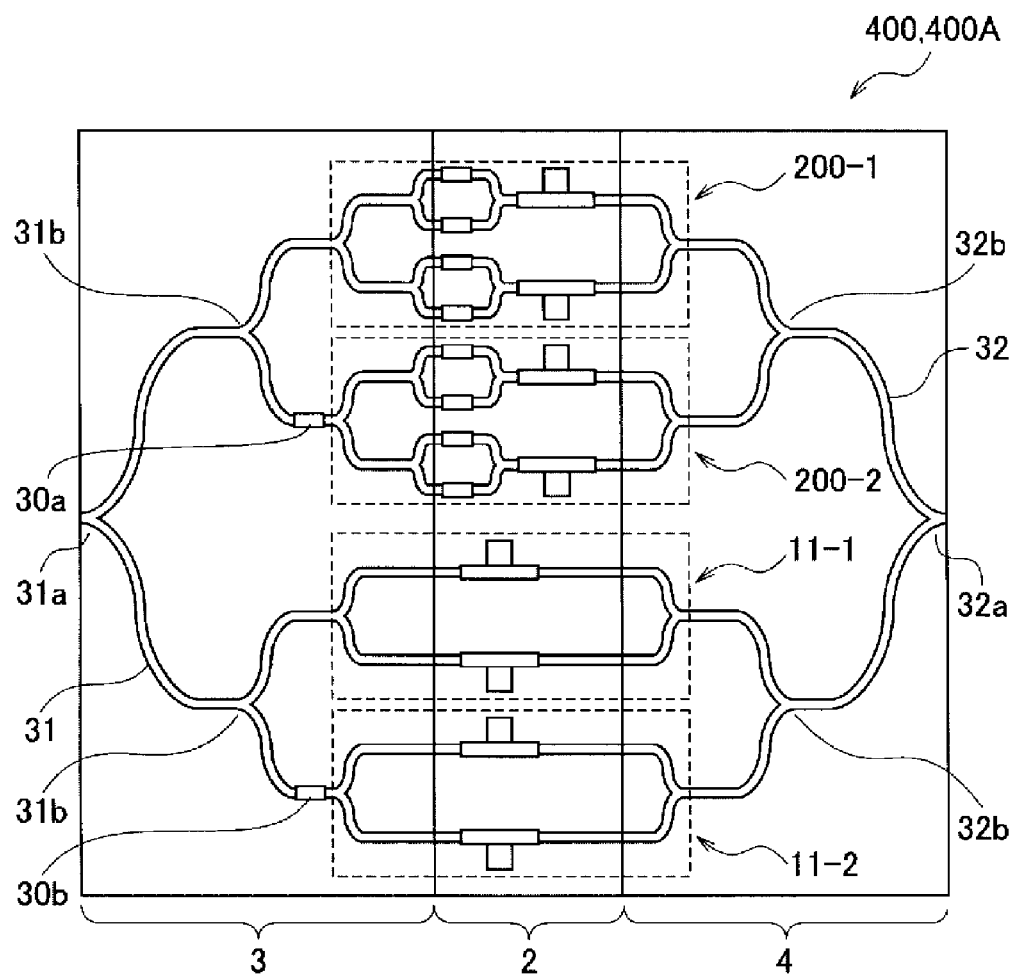
FIG. 15 is a top view that schematically illustrates the construction of a 16QAM optical phase modulator, which is a multi-value optical phase modulator, of a third embodiment of the present invention.
Figure 16:
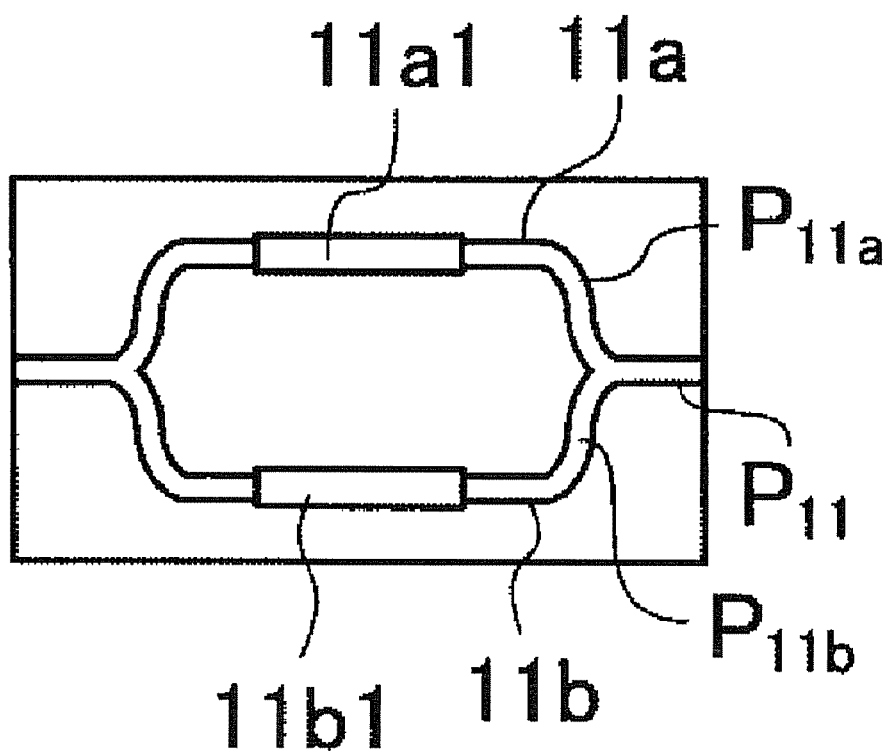
FIG. 16 is a schematic diagram that illustrates a DPSK optical phase modulator, which is a MZ modulator, as one example of a conventional binary optical phase modulator.
Figure 17B:
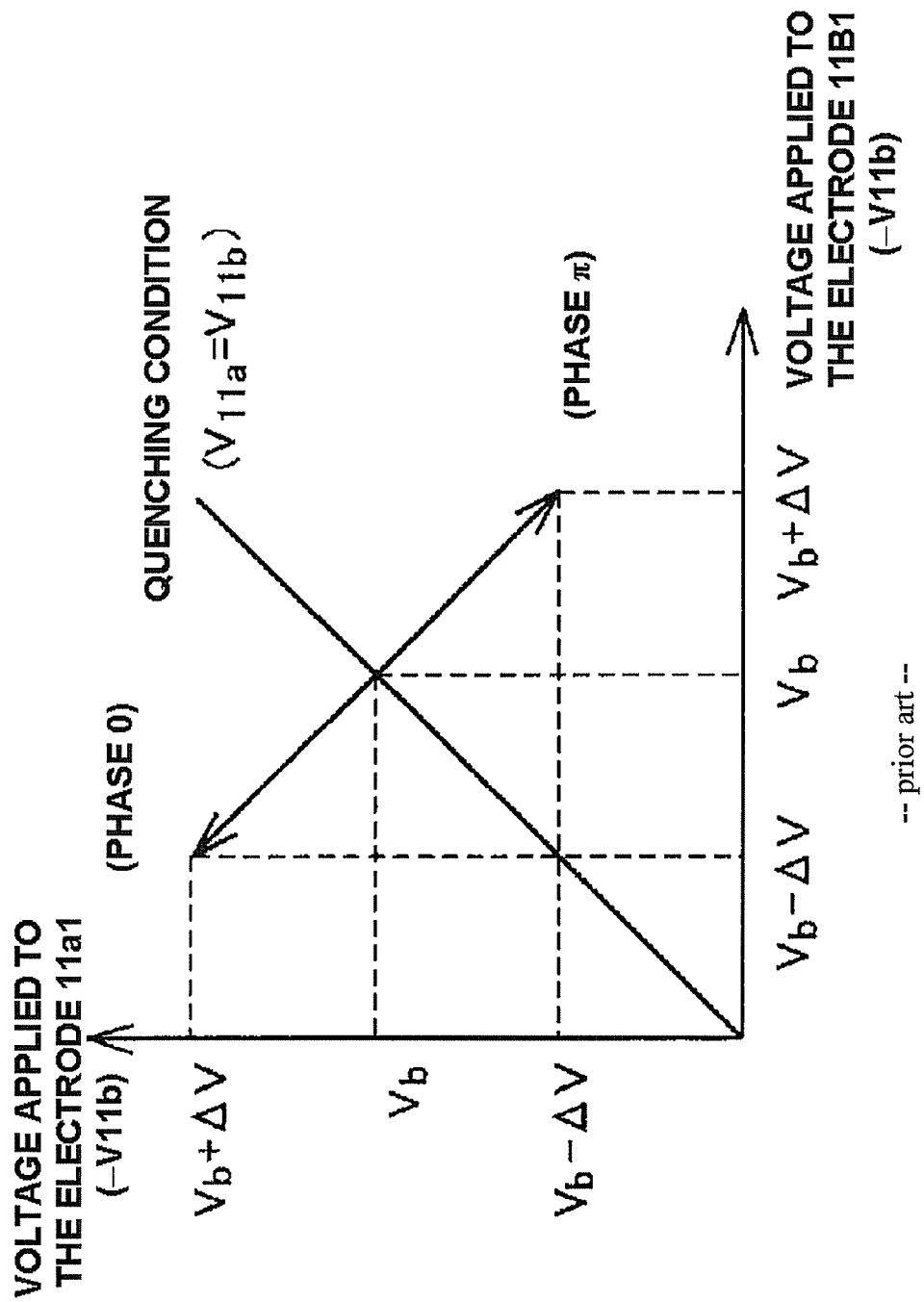
Figure 18:
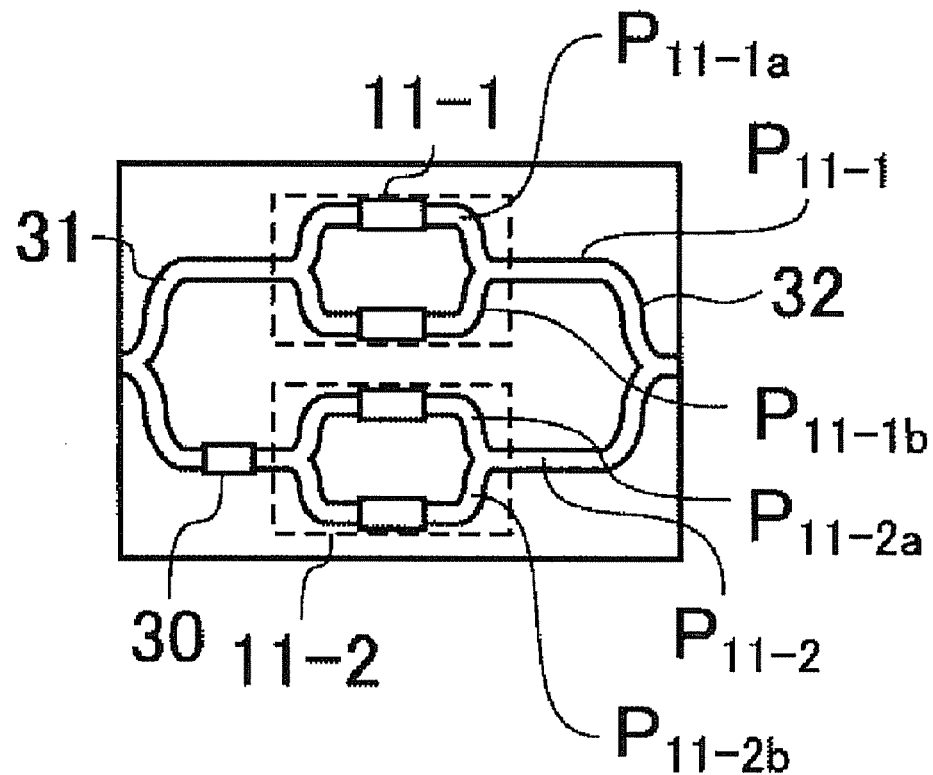
FIG. 18 is a schematic diagram that illustrates one example of a conventional DQPSK optical phase modulator.
Figure 19A:
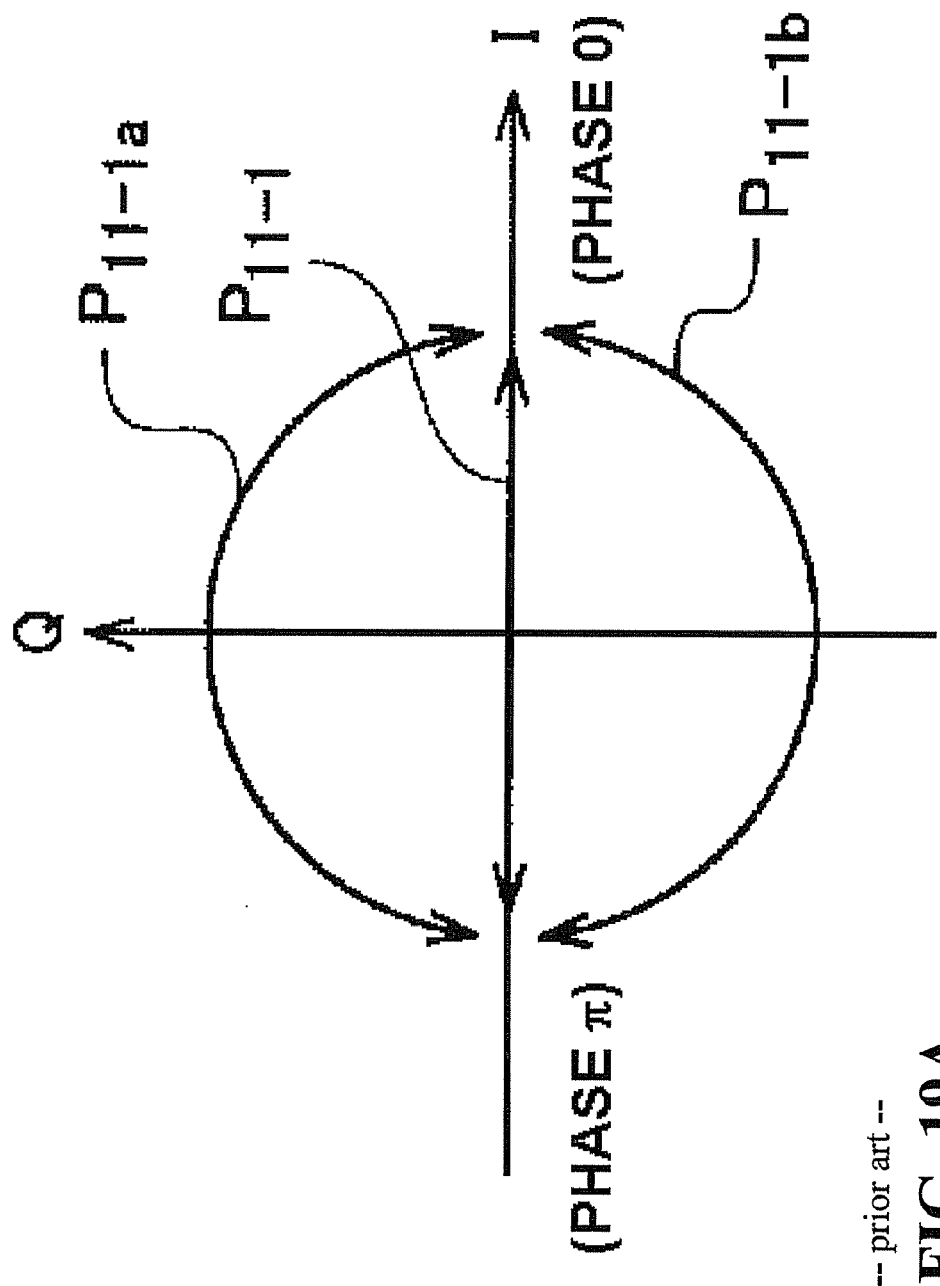
FIGS. 19A to 19C are diagrams for explaining the operation of phase modulation in a DQPSK optical phase modulator.
Figure 19B:
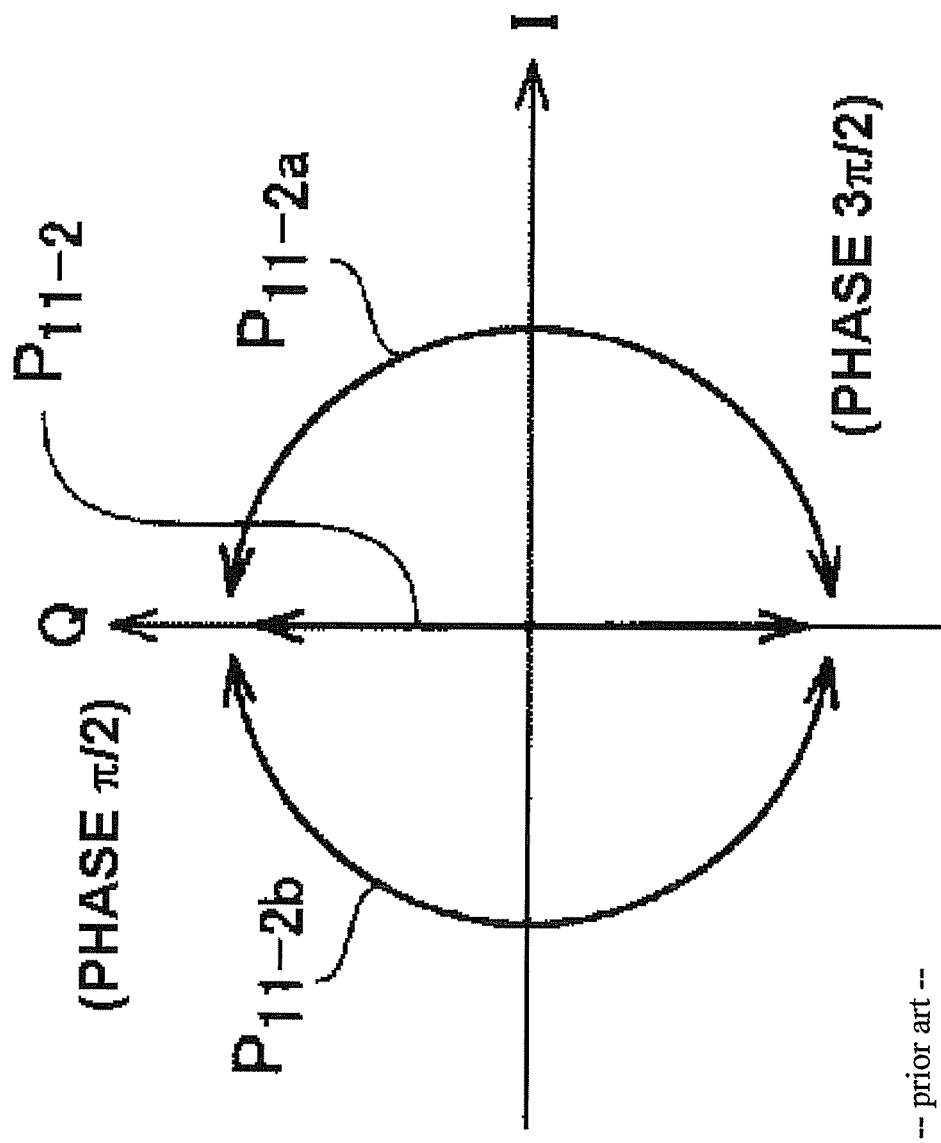
Figure 19C:
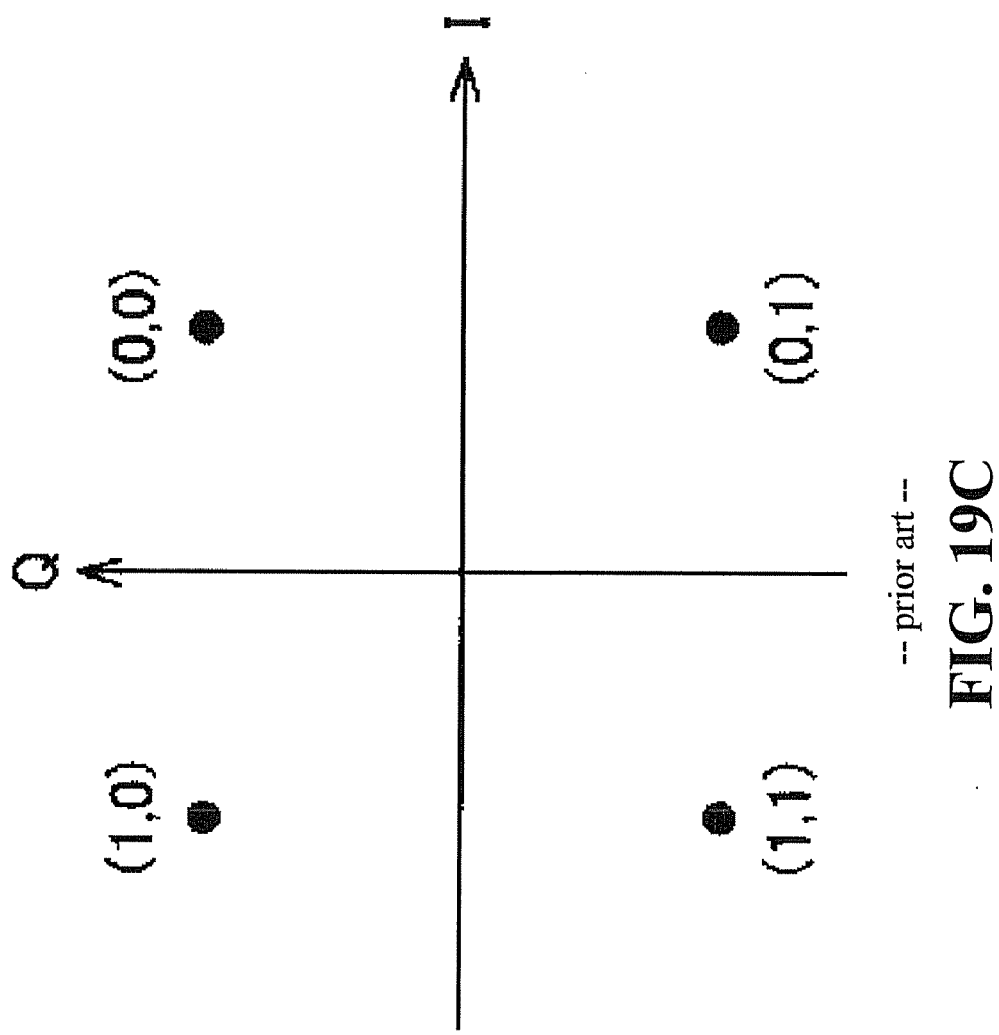
Figure 20:
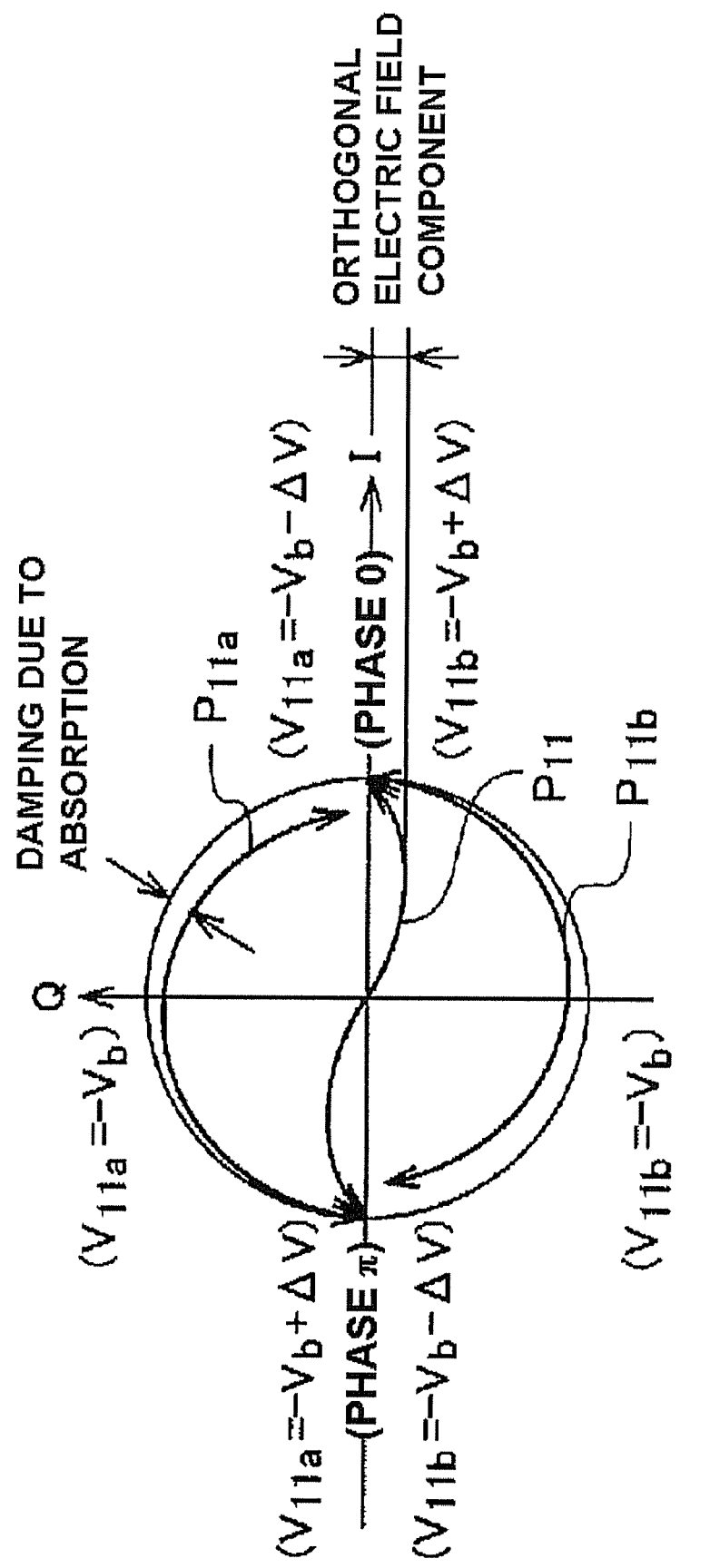
FIG. 20 is a diagram that illustrates in polar coordinates the electric field of each optical waveguide path arm and a combined electric field in a DPSK optical phase modulator comprising a semiconductor.

FIG. 15 is a top view that schematically illustrates the construction of a 16QAM optical phase modulator, which is an optical phase modulator of a third embodiment of the invention, and corresponds to the case where n=2. As illustrated in FIG. 15, the optical modulator 400 comprises: a branching optical waveguide path 31 in which two-branch dividing units 31a, 31b are connected in a 2-level cascade connection, having $2^2$ (=4) branching ends; a combining optical waveguide path 32 in which four DPSK optical phase modulators 200-1, 200-2, 11-1, 11-2 that are connected in parallel to the branch ends, and two-branch combining units 32a, 32b are connected in a 2-level cascading connection; and π/2 phase shifters 30a, 30b. Here, since a large signal voltage is added to the upper two DPSK optical phase modulators 200-1, 200-2, an orthogonal electric field component due to the light absorption in the semiconductor becomes a problem, so the DPSK optical phase modulator 200 of the first embodiment of the invention is applied, and since no large signal voltage is added to the lower two DPSK optical phase modulators 11-1, 11-2, an orthogonal electric field component due to the light absorption in the semiconductor does not become a problem, so DPSK optical phase modulators that do not comprise sub Mach-Zehnder interferometers 21, 22 are applied.

In this optical phase modulator 400, the area 2 that has high-frequency electrodes is constructed using semiconductor optical waveguide paths, and the other areas 3, 4, which include the branching optical waveguide path 31 and combining optical waveguide path 32, are constructed using silica optical waveguide paths. By doing so, it is possible to shorten the length of the semiconductor optical waveguide path area 2, so it is possible to keep loss in the semiconductor low. Moreover, combining/dividing units and optical waveguide paths can be manufactured using silica optical waveguide paths that have better precision, and by keeping the number of combining/dividing units that are manufactured using semiconductor optical waveguide paths to a minimum, it is possible to reduce the increase of extinction degradation due to stray light and insertion loss.

It is also possible that all of the areas could be constructed using semiconductor optical waveguide paths.

It is omitted in the figure because the figure would become complicated, however, in this 16QAM optical phase modulator 400, the DPSK optical phase modulators 200-1, 200-2 are wired as illustrated in FIG. 5 or FIG. 10, and by wiring the DPSK optical phase modulators 11-1, 11-2 as done conventionally, it is possible to construct the 16QAM optical phase modulating device 400A. Part of the 16QAM optical phase modulating device 400A includes a DPSK optical phase modulating device that uses DPSK optical phase modulators 200-1, 200-2, and as explained in the first embodiment, in the DPSK optical phase modulating device that uses DPSK optical phase modulators 200-1, 200-2, the occurrence of an orthogonal electric field component due to the difference in the voltages applied to the first and second high-frequency electrodes 11a1, 11b1 by the first and second sub Mach-Zehnder interferometers 21, 22 is suppressed, and optical phase modulation is performed. On the other hand, the DPSK optical phase modulating device that uses the conventional DPSK optical phase modulators 11-1, 11-2 is driven by a small signal voltage centering on a specified reverse bias voltage, and outputs light having an electric field with small amplitude.

These four DPSK optical phase modulating devices are such that each of the DPSK optical phase modulators are connected in parallel using the branching optical waveguide path 31, combining optical waveguide path 32 and phase shifters 30a, 30b as illustrated in FIG. 15, so the 16QAM optical phase modulating device 400A outputs light having combinations of 16 amplitudes and phases.

Therefore, even when the voltage signal from the signal generator changes at high speed, time differentiation of the phase angle is prevented, or in other words, widening of the frequency bandwidth is prevented, and thus degradation of transmission signals due to the dispersion of optic fiber is prevented.

The binary optical phase modulator or binary optical phase modulating device of the claims of the invention are interpreted as including the case of being integrated and operating as part of a 4-value or greater multi-value optical phase modulator or multi-value optical phase modulating device (DQPSK, 16QAM, 256QAM, etc.)

Although the invention has been described with respect to specific embodiments of a complete and clear disclosure, appended claims are not to be thus limited, but are to be construed as embodying all modifications and alternative constructions that may occur to one skilled in the art that fairly fall within the basic teaching herein set forth.

What is claimed is:

1. A 4-value optical phase modulator comprising:
    a first binary optical phase modulator and a second binary optical phase modulator, each comprising:
        a main Mach-Zehnder interferometer having a first main optical waveguide path arm and a second main optical waveguide path arm, which have a first high-frequency electrode and a second high-frequency electrode, respectively, and whose initial phase difference in the used wavelength is $\pi$;
        a first sub Mach-Zehnder interferometer having a first sub optical waveguide path arm and a second sub optical waveguide path arm that are formed in said first main optical waveguide path arm, which have a third high-frequency electrode and a fourth high-frequency electrode, respectively, and whose initial phase difference in the used wavelength is 0; and
        a second sub Mach-Zehnder interferometer having a third sub optical waveguide path arm and a fourth sub optical waveguide path arm that are formed in said second main optical waveguide path arm, which have a fifth high-frequency electrode and a sixth high-frequency electrode, respectively, and whose initial phase difference in the used wavelength is 0; wherein of said first and second main optical waveguide path arms and said first through fourth sub optical waveguide path arms, at least the portion where said first through sixth high-frequency electrodes are formed are semiconductor waveguide paths that are formed on a semiconductor substrate;
    an input optical waveguide path that divides an input light at input ends of said first binary optical phase modulator and said second binary optical phase modulator;
    an output optical waveguide path that combines the light from output ends of said first binary optical phase modulator and said second binary optical phase modulator; and
    phase shifters that cause a phase of output light from said first binary optical phase modulator and said second binary optical phase modulator to differ by $\pi/2$.

2. A multi-value optical phase modulator, comprising:
    a branching optical waveguide path in which two-branch dividing units are connected in an n-order cascade connection of 2;
    $2^n$ number of binary optical phase modulators that are connected in parallel to the branch ends of said branching optical waveguide path; and
    a combining optical waveguide path in which two-branch combining units are connected in an n-level cascade connection to the output ends of said $2^n$ number of binary optical phase modulators; wherein
    of said $2^n$ number of binary optical phase modulators, at least two are the 4-value optical phase modulator according to claim 1.

3. A binary optical phase modulating device, comprising:
    the 4-value optical phase modulator according to claim 1;
    a signal generation unit that includes a signal generator that generates a bipolar signal, and an inverted signal generator that generates an inverted signal of said bipolar signal;
    a voltage regulation unit that includes a first voltage regulator to which said bipolar signal is input from said signal generator and that outputs a signal having reduced voltage amplitude, and a second voltage regulator to which said inverted signal is input from said inverted signal generator and that outputs a signal having reduced voltage amplitude; and
    a bias voltage supply unit having a first bias voltage supply unit that supplies a reverse bias voltage having an absolute value that is greater than the value of the voltage amplitude of said bipolar signal, a second bias voltage supply unit that supplies a second reverse bias voltage having an absolute value that is greater than the output voltage amplitude from said first voltage regulator and greater than the output voltage amplitude from said second voltage regulator, and a third bias voltage supply unit that supplies a third reverse bias voltage having an absolute value that is greater than the output voltage amplitude from said first voltage regulator and greater than the output voltage amplitude from said second voltage regulator;
    wherein said bipolar signal and said inverted signal are respectively superimposed with said first reverse bias voltage from said first bias voltage supply unit and applied to said first high-frequency electrode and said second high-frequency electrode; and
    the output from said first and second voltage regulators and said second and third reverse bias voltages are set and connected to said third through sixth high-frequency electrodes so that a large difference in light absorption caused by applying voltage to said first and second high-frequency electrodes is compensated by the difference in output light intensity of said first and second sub Mach-Zehnder interferometers.

4. A 4-value optical phase modulating device, comprising:
a first binary optical phase modulating device and;
a second binary optical phase modulating device, each according to the binary optical phase modulating device of claim 3;
an input optical waveguide path that divides input light into the input ends of the binary optical phase modulators of said first binary optical phase modulating device and the binary optical phase modulators of said second binary optical phase modulating device;
an output optical waveguide path that combines the light from the output ends of the binary optical phase modulators of said first binary optical phase modulating device and the binary optical phase modulators of said second binary optical phase modulating device; and
phase shifters that cause the phases of the output light from one binary optical phase modulator of said first binary optical phase modulating device and one binary optical phase modulator of said second binary optical phase modulating device to differ by $\pi/2$.

5. A 16-value or greater multi-value optical phase modulating device comprising at least one binary optical phase modulating device according to claim 3.

6. A binary optical phase modulating device, comprising:
the 4-value optical phase modulator according to claim 1;
a signal generation unit that includes a signal generator that generates a bipolar signal, and an inverted signal generator that generates an inverted signal of said bipolar signal;
a voltage regulation unit s that includes a first voltage regulator to which said bipolar signal is input from said signal generator and that outputs a signal having reduced voltage amplitude, and a second voltage regulator to which said inverted signal is input from said inverted signal generator and that outputs a signal having reduced voltage amplitude; and
a bias voltage supply unit having a first bias voltage supply unit that supplies a first reverse bias voltage having an absolute value that is greater than the value of the voltage amplitude of said bipolar signal, a second bias voltage supply unit that supplies a second reverse bias voltage having an absolute value that is greater than the output voltage amplitude from said first voltage regulator and greater than the output voltage amplitude from said second voltage regulator, and a third bias voltage supply unit that supplies a third reverse bias voltage having an absolute value that is greater than the output voltage amplitude from said first voltage regulator and greater than the output voltage amplitude from said second voltage regulator; wherein
said bipolar signal and said inverted signal are superimposed with said first reverse bias voltage from said first bias voltage supply unit, respectively, and applied to said first high-frequency electrode and said second high-frequency electrode;
said output voltage from said first voltage regulator is superimposed with said second reverse bias voltage from said second bias voltage supply unit, and said third reverse bias voltage from said third bias voltage supply unit, respectively, and applied to said third high-frequency electrode and said fifth high-frequency electrode;
the output voltage from said second voltage regulator is superimposed with the third reverse bias voltage from said third bias voltage supply unit, and second reverse bias voltage from said second bias voltage supply unit, respectively, and applied to said fourth high-frequency electrode and said sixth high-frequency electrode; and
said second reverse bias voltage and said third reverse bias voltage are set near a straight line of relational expression that indicates an in-phase condition between the voltage that is applied to said third high-frequency electrode or said fifth high-frequency electrode and the voltage that is applied to the fourth high-frequency electrode or sixth high-frequency electrode, where the absolute value of said second reverse bias voltage is less than the absolute value of said third reverse bias voltage.

7. A binary optical phase modulating device, comprising:
the 4-value optical phase modulator according to claim 1;
a signal generation unit that includes a signal generator that generates a bipolar signal, and an inverted signal generator that generates an inverted signal of said bipolar signal;
a voltage regulation unit that includes a first voltage regulator to which said bipolar signal is input from said signal generator and that outputs a signal having reduced voltage amplitude, and a second voltage regulator to which said inverted signal is input from said inverted signal generator and that outputs a signal having reduced voltage amplitude; and
a bias voltage supply unit having a first bias voltage supply unit that supplies a first reverse bias voltage having an absolute value that is greater than the value of the voltage amplitude of said bipolar signal, a second bias voltage supply unit that supplies a second reverse bias voltage having an absolute value that is greater than the output voltage amplitude from said first voltage regulator and greater than the output voltage amplitude from said second voltage regulator, and a third bias voltage supply unit that supplies a third reverse bias voltage having an absolute value that is greater than the output voltage amplitude from said first voltage regulator and greater than the output voltage amplitude from said second voltage regulator; wherein
said bipolar signal and said inverted signal are superimposed with said first reverse bias voltage from said first bias voltage supply unit, respectively, and applied to said first high-frequency electrode and said second high-frequency electrode;
said output voltage from said second voltage regulator is superimposed with said second reverse bias voltage from said second bias voltage supply unit, and said third reverse bias voltage from said third bias voltage supply unit, respectively, and applied to said third high-frequency electrode and said fifth high-frequency electrode;
the output voltage from said first voltage regulator is superimposed with the third reverse bias voltage from said third bias voltage supply unit, and second reverse bias voltage from said second bias voltage supply unit, respectively, and applied to said fourth high-frequency electrode and said sixth high-frequency electrode; and
said second reverse bias voltage and said third reverse bias voltage are set near a straight line of relational expression that indicates an in-phase condition between the voltage that is applied to said third high-frequency electrode or said fifth high-frequency electrode and the voltage that is applied to the fourth high-frequency electrode or sixth high-frequency electrode, where the absolute value of said second reverse bias voltage is greater than the absolute value of said third reverse bias voltage.

8. A 4-value optical phase, comprising:

a first binary optical phase modulator and a second binary optical phase modulator, each comprising:

a main Mach-Zehnder interferometer having a first main optical waveguide path arm and a second main optical waveguide path arm, which have a first high-frequency electrode and a second high-frequency electrode, respectively, and whose initial phase difference in the used wavelength is $\pi$;

a first sub Mach-Zehnder interferometer having a first sub optical waveguide path arm and a second sub optical waveguide path arm that are formed in said first main optical waveguide path arm, which have a third high-frequency electrode and a fourth high-frequency electrode, respectively, and whose initial phase difference in the used wavelength is 0; and a second sub Mach-Zehnder interferometer having a third sub optical waveguide path arm and a fourth sub optical waveguide path arm that are formed in said second main optical waveguide path arm, which have a fifth high-frequency electrode and a sixth high-frequency electrode, respectively, and whose initial phase difference in the used wavelength is 0; wherein of said first and second main optical waveguide path arms and said first through fourth sub optical waveguide path arms, at least the portion where said first through sixth high-frequency electrodes are formed are semiconductor waveguide paths that are formed on a semiconductor substrate;

an input optical waveguide path that divides an input light at input ends of said first binary optical phase modulator and said second binary optical phase modulator;

an output optical waveguide path that combines the light from output ends of said first binary optical phase modulator and said second binary optical phase modulator; and phase shifters that cause a phase of output light from said first binary optical phase modulator and said second binary optical phase modulator to differ by n/2, wherein a portion other than portions where said first through sixth high-frequency electrodes are formed that includes silica optical waveguide paths that are formed on a substrate; and said semiconductor optical waveguide paths and said silica optical waveguide paths are put together at the end surfaces thereof and optically coupled.

* * * * *